United States Patent
Kimpara et al.

(10) Patent No.: US 8,842,455 B2
(45) Date of Patent: Sep. 23, 2014

(54) ELECTRIC-POWER CONVERSION APPARATUS

(75) Inventors: Yoshihiko Kimpara, Chiyoda-ku (JP); Takayuki Kifuku, Chiyoda-ku (JP); Tetsuya Kojima, Chiyoda-ku (JP); Tatsuya Mori, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 639 days.

(21) Appl. No.: 13/039,841

(22) Filed: Mar. 3, 2011

(65) Prior Publication Data

US 2012/0057381 A1 Mar. 8, 2012

(30) Foreign Application Priority Data

Sep. 8, 2010 (JP) .................................. 2010-200927

(51) Int. Cl.
*H02M 1/00* (2006.01)
*G05F 1/00* (2006.01)

(52) U.S. Cl.
USPC .......................................... 363/78; 323/286

(58) Field of Classification Search
USPC ................................ 363/78; 323/286; 318/433
See application file for complete search history.

(56) References Cited

U.S. PATENT DOCUMENTS 5,303,156 A * 4/1994 Matsuoka et al. ............... 361/88
6,013,994 A * 1/2000 Endo et al. .................... 318/432

FOREIGN PATENT DOCUMENTS

| JP | 07-015972 A | | 1/1995 |
|---|---|---|---|
| JP | 2006-064596 A | | 3/2006 |
| JP | 2006-262677 A | | 9/2006 |
| JP | 2007-318914 A | | 12/2007 |
| JP | 2007318914 A | * | 12/2007 |
| JP | 2009-017671 A | | 1/2009 |

OTHER PUBLICATIONS

Japanese Office Action issued Aug. 1, 2012 in a corresponding Japanese Patent Application No. 2010-200927.

* cited by examiner

*Primary Examiner* — Jue Zhang
(74) *Attorney, Agent, or Firm* — Sughrue Mion, PLLC

(57) ABSTRACT

There is provided an electric-power conversion apparatus including a chopper circuit; a current sense resistor that detects the output current of the chopper circuit; a differential detection circuit that outputs, as a differential detection signal (vo), the electric potential difference across the current sense resistor; and a calculation means that corrects the differential detection signal (vo) from the differential detection circuit by use of a control signal (D1) for the chopper circuit so as to calculate the output current (i0) of the chopper circuit.

8 Claims, 20 Drawing Sheets

ELECTRIC-POWER CONVERSION APPARATUS

BACKGROUND OF THE INVENTION

1. Field of the Invention

The present invention relates to an electric-power conversion apparatus provided with an electric current detection function capable of accurately calculating the value of the output current of a chopper circuit for supplying electric power to a load.

2. Description of the Related Art

Most of electric-power conversion apparatuses such as inverters or converters each include, as a chopper circuit, an upper stage power semiconductor device connected between a first electric potential and a second electric potential and a lower stage power semiconductor device connected between the second electric potential and a reference electric potential. Based on a desired phase width signal (duty ratio), at least one of the upper stage power semiconductor device and the lower stage power semiconductor device is turned on and off so that electric-power conversion is performed between the first electric potential and the second electric potential. For example, in the case where this kind of electric-power conversion apparatus is applied to an inverter that drives a three-phase AC rotating machine, a DC power source is connected between the first electric potential and the reference electric potential, a desired phase width is appropriately given, and based on the phase width, the upper stage power semiconductor device and the lower stage power semiconductor device are switched, so that the second electric potential with respect to the reference electric potential is converted into an AC voltage. In other words, electric-power conversion is performed in such a way that the first electric potential, which is a DC voltage with respect to the reference electric potential, is converted into the second electric potential, which is an AC voltage. In an inverter that drives a three-phase AC rotating machine, by applying this kind of electric-power conversion to each of the U-phase, the V-phase, and the W-phase, electric-power conversion from a DC power into a three-phase AC power is performed.

In the case where a three-phase AC rotating machine is driven, an electric current supplied by the electric-power conversion apparatus and the torque of the three-phase AC rotating machine are in a close relationship; therefore, insufficient accuracy of detecting the electric current causes a torque ripple, rotational speed ripple, or abnormal noise in the three-phase AC rotating machine.

For example, in the case where there is driven a three-phase AC rotating machine provided in an electric power steering apparatus mounted in a vehicle, a torque ripple emerges as a vibration of the steering wheel; therefore, it is required to accurately detect the electric current so as to reduce the torque ripple as much as possible.

The methods of detecting the output current of an electric-power conversion apparatus include a method utilizing a current transformer and a method utilizing a hole current sensor. Because being not capable of detecting a DC current, the method utilizing a current transformer cannot be adopted in the application in which a three-phase AC rotating machine is in the stop mode or driven at a low rotation speed. In addition, when being mounted in a vehicle, an electric-power conversion apparatus needs to operate at a severe temperature, at a severe humidity, in a vibration, and in a dusty condition; thus, a current detecting resistor is superior to a hole device as the hole current sensor in terms of robustness.

Accordingly, in a conventional electric-power conversion apparatus disclosed in Patent Document 1, there are provided arm circuits for three phases in each of which an upper-arm switching device and a lower-arm switching device are connected in series with each other, the upper-arm switching device is connected with the positive electrode of a DC power source, and the lower-arm switching device is connected with the negative electrode of the DC power source; and current detection resistors that are inserted in series into the respective lower-arm switching devices for at least two phases and each of which detects a current flowing in the lower-arm switching device. By comparing a carrier and a three-phase voltage command wave signal generated based on the foregoing current, the upper-arm and lower-arm switching devices are on/off-controlled through pulse-width modulation, so that a current to be supplied by electric-power conversion apparatus is obtained.

Moreover, for example, a conventional electric-power conversion apparatus disclosed in Patent Document 2 is provided with a current detection means having a shunt resistor provided at the power source side of a load to be PWM-controlled by a drive circuit; in each of the on duration and the off duration of a PWM control signal, the voltage across the shunt resistor is detected; based on the difference between the voltage detected during the on duration and an offset voltage, which is the voltage detected during the off duration, the current flowing in a load is detected.

Furthermore, for example, in a conventional electric-power conversion apparatus disclosed in Patent Document 3, a current current sense resistor is inserted into the output circuit of an inverter that inverts DC electric power into AC electric power for driving a motor, by use of a power device having a gate circuit, and there are provided a sigma-delta modulator that converts the voltage generated across the current sense resistor into a sigma-delta modulated digital signal, an electricity insulating coupler that transfers the digital signal in an electrically insulated manner, a digital filter that demodulates the transferred signal, and a control signal generation circuit that controls the gate circuit of the inverter, based on the output of the digital filter, so that the current to be supplied by the electric-power conversion apparatus is obtained.

Still moreover, for example, in a conventional electric-power conversion apparatus disclosed in Patent Document 4, a motor is driven by an upper-arm switching device and a lower-arm switching device, and there are provided a first reference voltage source that adopts, as a reference, the electric potential of the positive electrode of the battery for the motor, a second reference voltage source that adopts, as a reference, the electric potential of the ground, a shunt resistor provided between a terminal of the motor and the connection point between the upper-arm switching device and the lower-arm switching device, a switching means that outputs the voltage from one of the first and second reference voltage sources, based on the electric potential of the shunt resistor, a voltage dividing means that divides the output of the switching means and the voltage across the shunt resistor so as to generate two voltage signals, and an amplification means that receives the two voltage signals generated by the voltage dividing means and outputs a voltage that increases or decreases at a predetermined amplification factor in accordance with the value and the direction of a current flowing in the shunt resistor, so that the current to be supplied by the electric-power conversion apparatus is obtained.

PRIOR ART REFERENCE

Patent Document

[Patent Document 1] Japanese Patent Application Laid-Open No. 2009-017671
[Patent Document 2] Japanese Patent Application Laid-Open No. 2006-262677
[Patent Document 3] Japanese Patent Application Laid-Open No. H7-015972
[Patent Document 4] Japanese Patent Application Laid-Open No. 2006-064596

In these conventional electric-power conversion apparatuses, there have been the following problems.

In the conventional electric-power conversion apparatus disclosed in Patent Document 1, because the current detection resistors that detect currents are inserted in series into the respective lower-arm switching devices, currents flowing in the respective lower-arm switching devices can be obtained; however, currents flowing in the upper-arm switching devices cannot be obtained. Accordingly, the current during the duration in which the upper-arm switching device is on and the lower-arm switching device is off cannot be obtained; thus, there has been a problem that the on/off command for the switching device is restricted. There has been a problem that when a three-phase AC rotating machine is driven by utilizing this kind of electric-power conversion apparatus, the restriction on the on/off command for the switching device also restricts the maximum voltage that can be outputted by the electric-power conversion apparatus.

Moreover, in the conventional electric-power conversion apparatus disclosed in Patent Document 2, because the current flowing in the load is detected by adopting, as an offset voltage for a voltage detected during a duration in which the PWM control signal is on, a voltage detected during a duration in which the PWM control signal is off, there exists restriction that the shunt resistor needs to be located in a path in which no current flows while the PWM control signal is off; thus, there has been a problem that there cannot be detected a current flowing in a path in which the current flows even while the PWM control signal is off.

Still moreover, in the conventional electric-power conversion apparatus disclosed in Patent Document 3, because a current sense resistor is inserted into the output circuit of an inverter that inverts DC electric power into AC electric power for driving a motor, by use of a power device having a gate circuit, and a current is obtained based on the voltage across the current detection resistor; therefore, the conventional electric-power conversion apparatus disclosed in Patent Document 3 has an advantage in that unlike the electric-power conversion apparatus disclosed in Patent Document 1, no restriction is imposed on the on/off command for the switching device. However, because a digital signal is transferred in an electrically insulated manner, there has been a problem that a power source is required also at the insulated side or that the apparatus is expensive because an electricity insulating coupler such as a photocoupler is required.

Furthermore, in the conventional electric-power conversion apparatus disclosed in Patent Document 4, because a current is obtained by detecting, in an insulating manner, the electric potential difference between the shunt resistor provided between both terminals of a motor and the connection point between the upper-arm switching device and the lower-arm switching device, there exists no restriction on the on/off command for the switching device, and no power source for the insulation is required. However, in order to configure the switching means, there are required a PNP-type transistor that outputs a voltage of a first reference voltage source when the voltage across the shunt resistor is relatively high and an NPN-type transistor that outputs a voltage of a second reference voltage source when the voltage across the shunt resistor is relatively low; thus, there has been a problem that the apparatus is expensive.

SUMMARY OF THE INVENTION

The present invention has been implemented in order to solve the foregoing problems; the objective thereof is to obtain an electric-power conversion apparatus that is inexpensive and is provided with an electric current detection function capable of accurately calculating the output current of a chopper circuit.

An electric-power conversion apparatus according to the present invention includes a chopper circuit; a current sense resistor that detects the output current of the chopper circuit; a differential detection circuit that outputs, as a differential detection signal, the electric potential difference across the detection resistor; and a calculation means that corrects the differential detection signal from the differential detection circuit by use of a control signal for the chopper circuit so as to calculate the output current of the chopper circuit.

The calculation means calculates a switching signal for turning on or off the chopper circuit based on a phase width signal, which is a control signal for the chopper circuit, and calculates the output current of the chopper circuit based on the differential detection signal; the chopper circuit is configured with an upper stage power semiconductor device connected between a first electric potential and a second electric potential and a lower stage power semiconductor device connected between the second electric potential and a reference electric potential; the current sense resistor is connected between the second electric potential and the third electric potential; and the differential detection circuit detects the electric potential difference between the second electric potential and the third electric potential.

In the electric-power conversion apparatus according to the present invention, the differential detection signal is corrected by the control signal for the chopper circuit; therefore, because there can be performed calculation of the output current, of the chopper circuit, which corresponds to an offset change caused by an in-phase voltage, there can be obtained an electric-power conversion apparatus that is inexpensive and can accurately detect a current.

In an electric-power conversion apparatus according to the present invention, because the current sense resistor is connected between the second electric potential and the third electric potential, the current supplied from the second electric potential to the third electric potential can be obtained, regardless of whether or not the upper stage power semiconductor device or the lower stage power semiconductor device is on.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
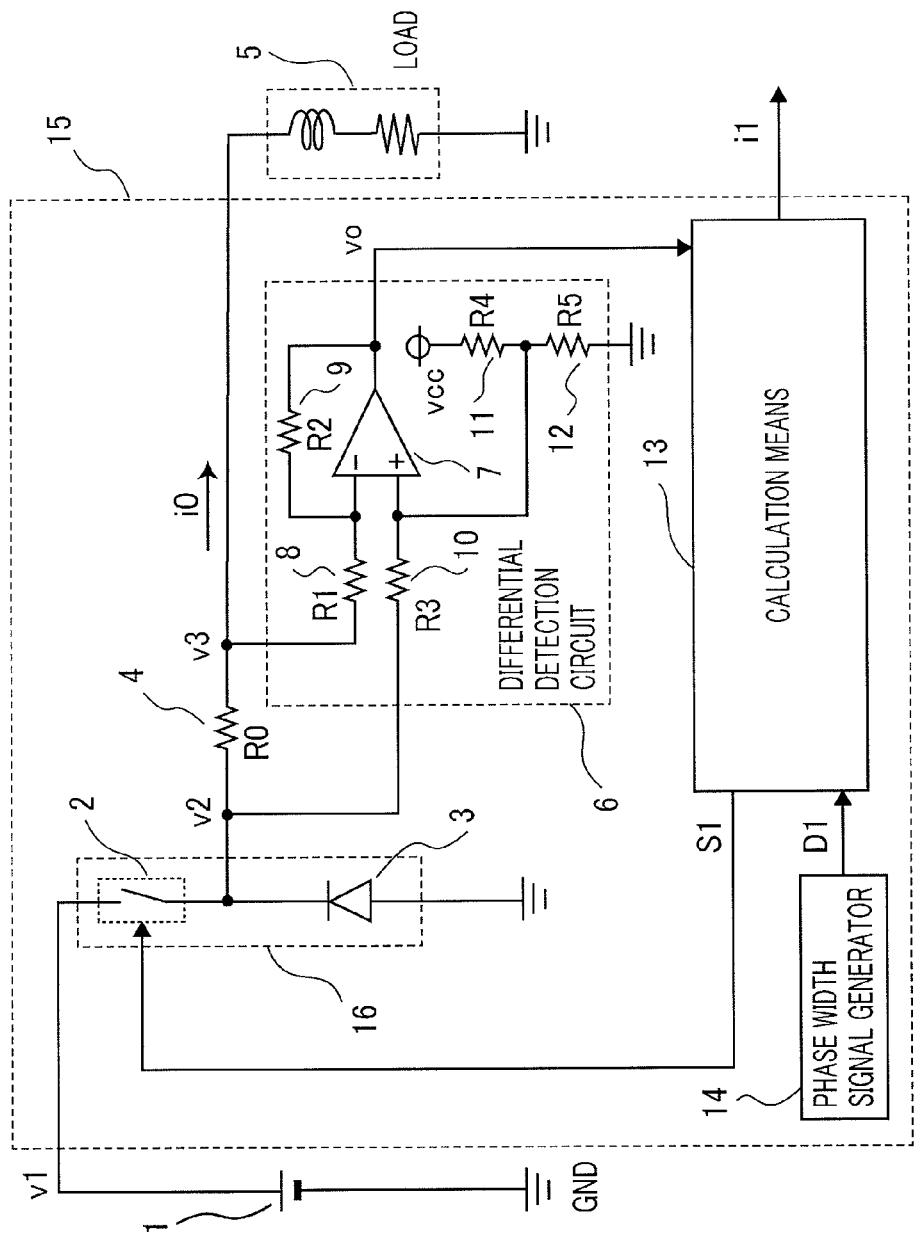
FIG. 1 is a diagram illustrating the overall configuration of an electric-power conversion apparatus according to Embodiment 1 of the present invention.

FIG. 1 is a diagram illustrating the overall configuration of an electric-power conversion apparatus according to Embodiment 1 of the present invention. In FIG. 1, an electric load 5 and a DC voltage source 1 having a voltage difference v1 are connected with an electric-power conversion apparatus 15.

The electric-power conversion apparatus 15 is provided with a chopper circuit 16, a differential detection circuit 6, a calculation means 13, and a phase width signal generator 14; as the control signals for the chopper circuit 16, there exist a phase width signal D1 outputted by the phase width signal generator 14 and a switching signal S1 outputted by the calculation means 13. The phase width signal D1 corresponds to the ratio of the conduction duration of the upper stage power semiconductor device 2 to the conduction duration of the lower stage power semiconductor device 3 and varies ranging from "0" to "1"; the upper stage power semiconductor device 2 and the lower stage power semiconductor device 3 are included in the chopper circuit 16. The phase width signal D1 is also referred to as a duty ratio. The switching signal S1 is a signal for turning on or off the upper stage power semiconductor device 2 included in the chopper circuit 16.

The negative electrode of the DC voltage source 1 having the voltage difference v1 is connected with the ground potential; The positive electrode of the DC voltage source 1 is connected with one of the terminals of the upper stage power semiconductor device 2 included in the chopper circuit 16. The upper stage power semiconductor device 2 turns on and off when the switching signal S1 is "TRUE" and "FALSE", respectively. One of the terminals of the lower stage power semiconductor device 3 and one of the terminals of a current sense resistor 4 having a resistance value of R0 [Ω] are connected with the other terminal of the upper stage power semiconductor device 2; the other terminal of the lower stage power semiconductor device 3 is connected with the ground potential. The lower stage power semiconductor device 3 turns on when a current flows from the ground potential to the lower stage power semiconductor device 3; the lower stage power semiconductor device 3 turns off when a current flows from the lower stage power semiconductor device 3 to the ground potential. In Embodiment 1, the upper stage power semiconductor device 2 is formed of a semiconductor switching device such as a MOS-FET or an IGBT; the lower stage power semiconductor device 3 is formed of a semiconductor rectifier such as a diode.

A second electric potential v2 becomes equal to the first electric potential v1 during a duration in which the upper stage power semiconductor device 2 is on. The electric load 5 is a load consisting of a coil and a resistor that are connected in series with each other. A current that passes through a coil always varies continuously; therefore, when the state of the upper stage power semiconductor device 2 changes from "on" to "off", the current i0 is supplied from the reference electric potential to the electric load 5 by way of the power semiconductor device 3, which is a diode. The one terminal of the electric load 5 is connected with the other terminal of the current sense resistor 4, and the other terminal of the electric load 5 is connected with the ground potential.

Here, definition is made in such a way that the ground potential is the reference electric potential, the positive-electrode potential of the DC voltage source 1 is the first electric potential v1, the electric potential of the connection point between the upper stage power semiconductor device 2 and the lower stage power semiconductor device 3 is the second electric potential v2, the electric potential of the connection point between the current sense resistor 4 and the electric load 5 is a third electric potential v3. Additionally, definition is made in such a way that the current supplied to the electric load 5 by way of the current sense resistor 4 is a current i0. In Embodiment 1, the electric load 5 is a load consisting of a coil and a resistor that are connected in series with each other; however, there is no restriction on the combination for the electric load; a capacitor, a battery, and the like may be connected in series with and/or in parallel with one another.

The differential detection circuit 6 detects the electric potential difference between the second electric potential v2 and the third electric potential v3 and then outputs a differential detection signal vo. The differential detection circuit 6 is configured with an operational amplifier 7 and resistors 8 through 12. The resistor 8 having a resistance value of R1 [Ω] is connected between the negative differential input terminal of the operational amplifier 7 and the third electric potential v3; the resistor 9 having a resistance value of R2 [Ω] is connected between the negative differential input terminal of the operational amplifier 7 and the output terminal of the operational amplifier 7. The resistor 10 having a resistance value of R3 [Ω] is connected between the positive differential input terminal of the operational amplifier 7 and the second electric potential v2; the resistor 11 having a resistance value of R4 [Ω] is connected between the positive differential input terminal of the operational amplifier 7 and an arbitrary electric potential vcc; the resistor 12 having a resistance value of R5 [Ω] is connected between the positive differential input terminal of the operational amplifier 7 and the ground potential. The resistors 8 through 12 are selected in such a way that the following equations (1) and (2) are satisfied among the resistance values R1 through R5.

$$R1=R3 \qquad (1)$$

$$2 \times R2 = R4 = R5 \qquad (2)$$

The arbitrary electric potential vcc determines the offset value of the differential detection signal vo, which is the output of the operational amplifier 7; the differential detection signal vo varies with respect to vcc/2, in accordance with the current i0. In the case where the current i0 is "0", the output of the differential detection signal vo becomes vcc/2 [V]. For example, in the case where vcc is set to the foregoing reference electric potential, i.e., the ground potential, the differential detection signal vo varies with respect to the reference electric potential, ranging from a positive value to a negative value in accordance with the sign of the current i0. In the case where vcc is set to 5 [V], the differential detection signal vo varies with respect to 2.5 [V], in accordance with the current i0. Furthermore, when being configured to be non-insulated from the ground potential, the differential detection circuit 6 does not require both positive and negative power sources; thus, as the power source for the differential detection circuit 6, only an inexpensive positive power source is required.

The calculation means 13 calculates a switching signal S1 for turning on or off the upper stage power semiconductor device 2, based on a desired phase width signal D1 obtained from the phase width signal generator 14, calculates the current i0 passing through the current sense resistor 4, based on the differential detection signal vo, and outputs the current i0 as a calculation current i1.

Figure 2:
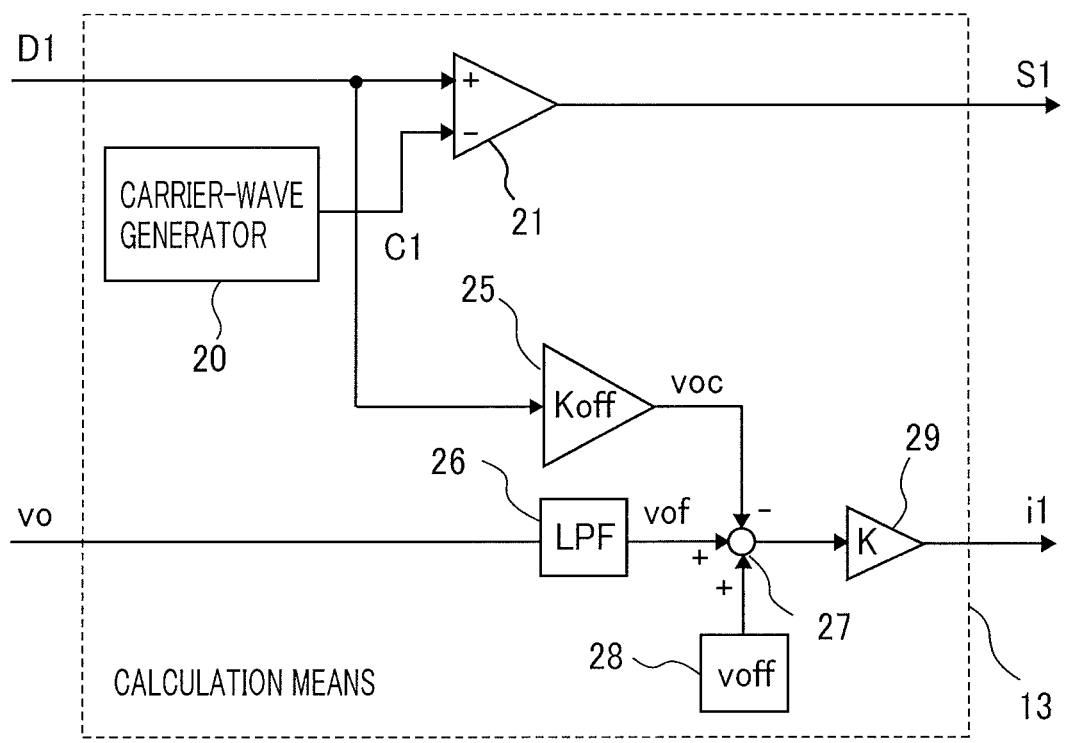
FIG. 2 is a diagram illustrating the internal configuration of a calculation means according to Embodiment 1.

FIG. 2 is a diagram illustrating the internal configuration of the calculation means 13 according to Embodiment 1. In FIG. 2, a carrier-wave generator 20 outputs a triangular-shaped carrier-wave signal C1 having the minimum value of "0", the maximum value "1", and the cycle of Tc [sec]. The cycle Tc [sec] is also referred to as the carrier period in a PWM modulation. A comparator 21 outputs the signal S1 having a value of "TRUE" or "FALSE". The comparator 21 compares the level of the phase width signal D1 and the level of the carrier-wave signal C1; in the case where D1 C1, the comparator 21 outputs "TRUE" as the signal S1, and in the case where D1<C1, the comparator 21 outputs "FALSE" as the signal S1.

A gain calculator 25 multiplies the phase width signal D1 by a gain Koff and then outputs the result of the multiplication as a corrected signal voc.

A lowpass filter 26 outputs, as the signal vof, a signal obtained by applying lowpass-filter processing to the differential detection signal vo. The time constant of the lowpass filter 26 is set to a constant raging from a value that is approximately equal to the cycle Tc of the carrier-wave signal C1 to a value that is approximately 20 times as large as the cycle Tc. The setting of the time constant will be explained later.

An adder-subtractor 27 adds an offset signal voff obtained from an offset setter 28 to the signal vof obtained through the lowpass-filter processing and subtracts the corrected signal voc obtained from the gain calculator 25 from the signal vof; then, the adder-subtractor 27 outputs the result of the addition and the subtraction to a gain calculator 29. The gain calculator 29 multiplies the output of the adder-subtractor 27 by "K" and outputs the result of the multiplication, as the calculation current i1.

Figure 3:
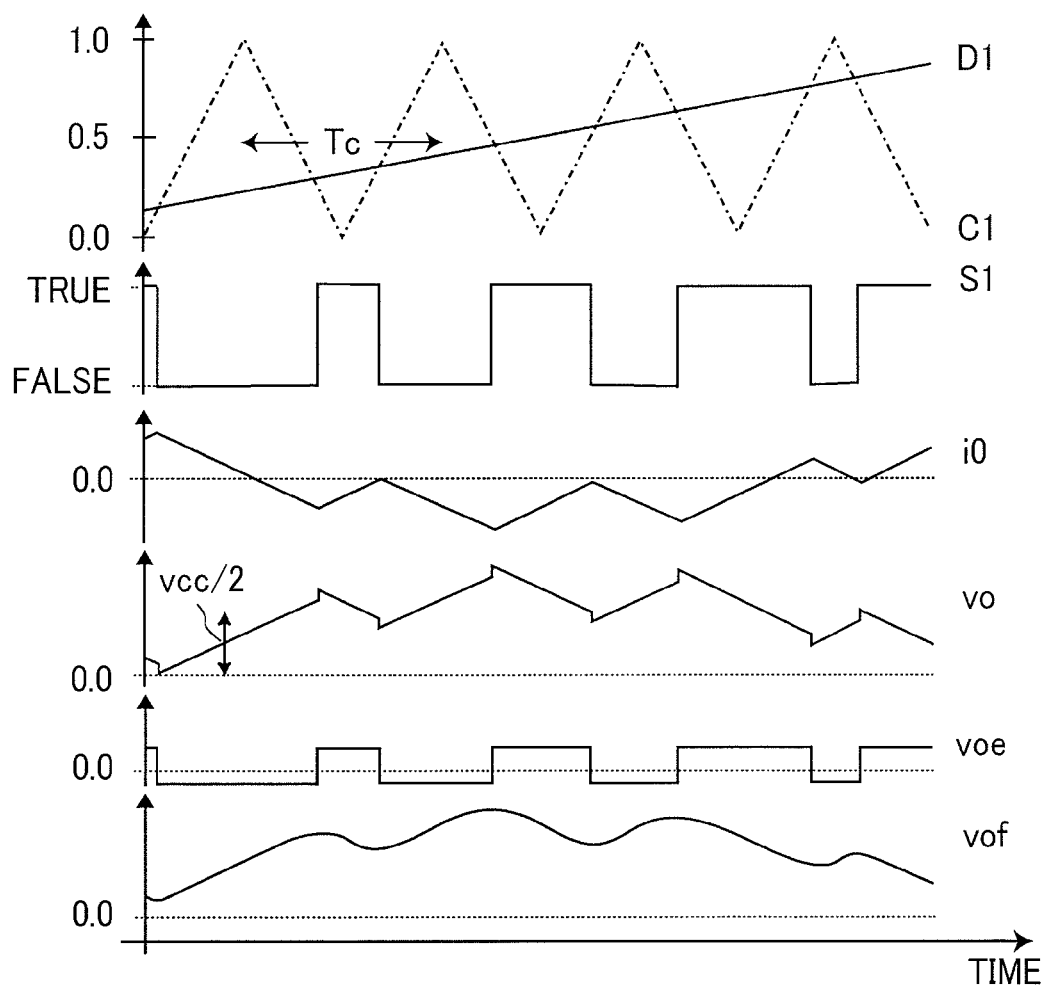
FIG. 3 is a set of charts for explaining the relationship, in the calculation means according to Embodiment 1, among the current i0 at a time when based on a desired phase width signal D1 and a carrier-wave signal C1, an upper stage power semiconductor device and a lower stage power semiconductor device are operated, the differential detection signal vo, the differential detection signal error voe, and the signal vof that is obtained by applying lowpass-filter processing to the differential detection signal.

FIG. 3 is a set of charts for explaining the relationship, in the calculation means 13, among the current i0 at a time when based on the desired phase width signal D1 and the carrier-wave signal C1, the upper stage power semiconductor device 2 is operated, the differential detection signal vo, the differential detection signal error voe, and the signal vof that is obtained by applying lowpass-filter processing to the differential detection signal vo.

In FIG. 3, there is dealt with a case where as the time elapses, the desired phase width signal D1 monotonically increases; however, when the desired phase width signal D1 is set to an AC signal alternating with respect to "0.5", the second electric potential may be an AC voltage alternating with respect to the middle potential between the first electric potential and the reference voltage. In FIG. 3, the top chart represents the waveforms of the phase width signal D1 and the carrier-wave signal C1. The phase width signal D1 ranges from "0" to "1". The carrier-wave signal C1 has the minimum value "0", the maximum value "1", and the cycle Tc. The second top chart represents the waveform of the switching signal S1. The comparator 21 compares the level of the phase width signal D1 and the level of the carrier-wave signal C1; in the case where D1 C1, the signal S1 becomes "TRUE", and in the case where D1<C1, the signal S1 becomes "FALSE".

The second electric potential v2 approximately coincides with a value obtained by multiplying the signal S1 by the first electric potential v1. As a result, the current i0 has such a waveform as represented in the third top chart in FIG. 3. The differential detection signal vo varies with respect to vcc/2 [V], in accordance with the current i0, and has such a waveform as represented in the fourth top chart in FIG. 3. The waveform of the differential detection signal vo in the fourth top chart in FIG. 3 is the sum of the value that is proportional to the current i0 and the value that is proportional to the switching signal S1; the center of the waveform is vcc/2 [V]. When the differential detection circuit 6 operates ideally, the differential detection signal vo has a waveform with the center of vcc/2 [V], in proportion to the current i0; however, because in practice, complete common mode rejection cannot be implemented, the differential detection signal vo has such a waveform as represented in the fourth top chart in FIG. 3.

Here, the common mode rejection will be explained. The equation (3) below is established among the current i0, the second electric potential v2, the arbitrary electric potential vcc, and the differential detection signal vo.

$$vo = K1 \times i0 + K2 \times v2 + K3 \times vcc \qquad (3)$$

where K1, K2, and K3 are constants that are defined by the equations (4) through (6) below.

$$K1 = -(R2 \div R1) \times R0 \quad (4)$$

$$K2 = \{R1 \times R4 \times R5 - R2 \times R3 \times (R5+R4)\} \div \{R1 \times (R3 \times R4 + R3 \times R5 + R4 \times R5)\} \quad (5)$$

$$K3 = \{(R1+R2) \times R3 \times R5\} \div \{R1 \times (R3 \times R4 + R3 \times R5 + R4 \times R5)\} \quad (6)$$

The gain K utilized for multiplication by the gain calculator 29 corresponds to 1/K1 in the equation (3). Accordingly, K may be expressed by "−R1÷(R2×R0)".

In particular, in the case where the relationships expressed by the equations (1) and (2) are established among R1 through R5, K2=0 and K3=½; thus, the differential detection signal vo is given by the equation (7) below.

$$vo = K1 \times i0 + vcc/2 \quad (7)$$

However, when the differential detection circuit 6 is actually configured, there exist unevennesses in the resistance values R1 through R5. As a result, because in the equation (5), K2≠0, the differential detection signal vo is given by the equation (3). If the second item in the right-hand side of the equation (3) can be removed, the differential detection signal vo has a desirable waveform that is proportional to the current i0 and whose center line is vcc/2. Removal of the second item in the right-hand side of the equation (3) is the common mode rejection.

The fifth top chart in FIG. 3 represents the differential detection signal error voe; in the case where K1×i0 v2, the second item in the right-hand side of the equation (3) becomes dominant, and hence the equation (8) below is established.

$$voe\ K2 \times v2 \quad (8)$$

The bottom chart in FIG. 3 represents the signal vof obtained by applying lowpass-filter processing to the differential detection signal vo. The signal vof is the same signal as obtained by applying lowpass-filter processing to the right-hand side of the equation (3). Because K1 is a constant value, when undergoing lowpass-filter processing, the first item in the right-hand side of the equation (3) becomes a value obtained by multiplying the filter-processed current i0 by "K1". Because K2 is also a constant value, when undergoing lowpass-filter processing, the second item in the right-hand side of the equation (3) becomes a value obtained by multiplying the filter-processed differential detection signal error voe by "K2".

Here, there will be considered the value obtained by applying lowpass-filter processing to the differential detection signal error voe. The differential detection signal error voe is proportional to the second electric potential v2. The second electric potential v2 is controlled by the chopper circuit 16 in such a way that the average value thereof coincides with a value obtained by multiplying the phase width signal D1 by the first electric potential v1. The time constant of the lowpass filter 26 in Embodiment 1 is set to a constant raging from a value that is approximately equal to the cycle Tc of the carrier-wave signal C1 to a value that is approximately 20 times as large as the cycle Tc. By applying a filter having a time constant that is approximately equal to the cycle Tc or larger to the differential detection signal error voe, the differential detection signal error voe, which is proportional to the second electric potential v2, is also averaged and becomes a value proportional to the phase width signal D1.

If the time constant of the lowpass filter 26 is approximately 20 times as large as the cycle Tc, it is large enough to average the differential detection signal error voe; if the time constant becomes larger than that, a disadvantage is provided due to delayed detection, although there is demonstrated an advantage that the differential detection signal error voe can be averaged. As described above, the value obtained by applying lowpass-filter processing to the differential detection signal error voe can be regarded as being proportional to the phase width signal D1.

Because K3 and vcc are constant values, the third item in the right-hand side of the equation (3) is also a constant value; thus, even when lowpass-filter processing is applied to the third item in the right-hand side, the value does not change.

Taking the above into account, in Embodiment 1 of the present invention, by making the gain calculator 25 multiply the phase width signal D1 by the gain Koff and then output the result of the multiplication as the corrected signal voc corresponding to the differential detection signal error voe, and by subtracting the corrected signal voc from the signal vof obtained by applying lowpass-filter processing to the differential detection signal vo, the common mode rejection is performed.

The second electric potential v2 approximately coincides with the multiplication product of the first electric potential v1 and the phase width signal D1. In the case where the first electric potential v1 is a constant value, the gain Koff is also a constant value; however, when the first electric potential v1 changes, the differential detection signal error voe also changes in accordance with the change in the first electric potential v1. In such a case as the first electric potential v1 changes, the gain Koff may change in accordance with the first electric potential v1.

As described above, in the electric-power conversion apparatus according to Embodiment 1 of the present invention, the differential detection signal vo is corrected by the control signal for the chopper circuit; therefore, the current value can be calculated in accordance with the offset change due to an in-phase voltage, whereby current detection can accurately be performed.

In the conventional electric-power conversion apparatus disclosed in Patent Document 1, when the upper stage power semiconductor device turns on, no current is supplied to the detection resistor, whereby in order to obtain a current, it is required to provide a duration in which the upper stage power semiconductor device is turned off; however, in Embodiment 1, because the current sense resistor is connected between the second electric potential and the third electric potential, the current supplied from the second electric potential v2 to the third electric potential v3 can be obtained, regardless of whether or not the upper stage power semiconductor device or the lower stage power semiconductor device is on.

Because the calculation means 13 calculates the corrected signal voc, based on a value proportional to the phase width signal D1, which is the control signal for the chopper circuit, it is made possible to perform common mode rejection by implementing correction in accordance with the change in the phase width signal D1; therefore, the current supplied from the second electric potential to the third electric potential can accurately be obtained.

In the conventional electric-power conversion apparatus disclosed in each of Patent Documents 1 and 2, in some cases, the current passing through the current sense resistor and the output current of the chopper circuit coincide with each other, and in some cases, they do not coincide with each other, depending on whether or not the chopper circuit is on. Accordingly, in such a conventional electric-power conversion apparatus as described above, in the case where a low-pass filter is applied to the differential detection signal and the time constant is set to be approximately equal to the cycle of the carrier-wave signal or larger, the value at a time when a current is supplied to the current sense resistor and the value at a time when no current is supplied to the current sense resistor are mingled with each other, and hence no current can be detected. In contrast, in Embodiment 1, the current passing through the current sense resistor and the output current of the chopper circuit are the same as each other, and no restriction is imposed on the time constant of the lowpass filter that is applied to the differential detection signal.

Moreover, in the calculation means 13, when a filter is applied to the differential detection signal vo, the time constant of the filter is set to a constant raging from a value that is approximately equal to the cycle of the carrier-wave signal to a value that is approximately 20 times as large as the cycle; thus, because being suppressed from fluctuating when the switching signal becomes on/off, the current value i1 can be corrected with the phase width signal. As a result, even when the differential amplification signal is analogue/digital-converted asynchronously with the carrier wave, an accurate current detection value can be obtained. The value of K2 may be obtained either from the resistance value of the differential detection circuit or through experimental measurement of K2.

Embodiment 2

In Embodiment 1, the lower stage power semiconductor device included in the chopper circuit is formed of a diode, and the upper stage power semiconductor device is turned on or off based on the switching signal S1 outputted by the calculation means; however, the upper stage power semiconductor device and the lower stage power semiconductor device included in the chopper circuit may be configured in such a way as to be turned on or off based on the switching signals G1 and G2, respectively, outputted by the calculation means.

Figure 4:
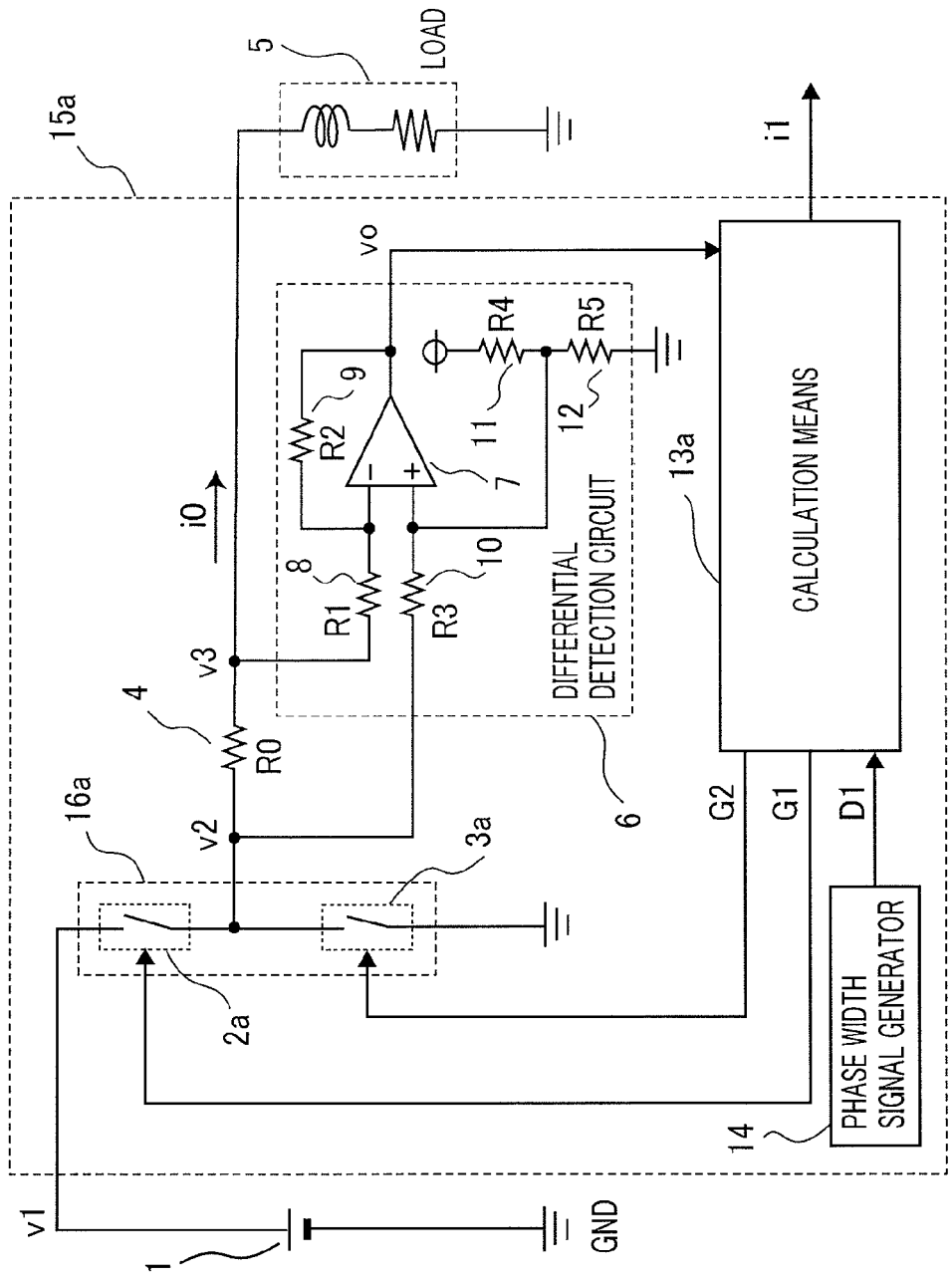
FIG. 4 is a diagram illustrating the overall configuration of an electric-power conversion apparatus according to Embodiment 2 of the present invention.

FIG. 4 is a diagram illustrating the overall configuration of this kind of electric-power conversion apparatus according to Embodiment 2 of the present invention; in the drawing, the same reference characters as those in Embodiment 1 denote the same or similar constituent elements.

In FIG. 4, an electric-power conversion apparatus 15a is provided with a chopper circuit 16a, the differential detection circuit 6, a calculation means 13a, the phase width signal generator 14, and the current sense resistor 4; as the control signals for the chopper circuit 16a, there exist the phase width signal D1 outputted by the phase width signal generator 14 and switching signals G1 and G2 outputted by the calculation means 13a. The phase width signal D1 corresponds to the ratio of the conduction duration of an upper stage power semiconductor device 2a to the conduction duration of a lower stage power semiconductor device 3a and varies ranging from "0" to "1"; the upper stage power semiconductor device 2a and the lower stage power semiconductor device 3a are included in the chopper circuit 16a. The phase width signal D1 is also referred to as a duty ratio. The switching signal G1 is a signal for turning on or off the upper stage power semiconductor device 2a included in the chopper circuit 16a; the switching signal G2 is a signal for turning on or off the lower stage power semiconductor device 3a included in the chopper circuit 16a.

The negative electrode of the DC voltage source 1 having the voltage difference v1 is connected with the ground potential; the positive electrode of the DC voltage source 1 is connected with one of the terminals of the upper stage power semiconductor device 2a included in the chopper circuit 16a. The upper stage power semiconductor device 2a turns on and off when the switching signal G1 is "TRUE" and "FALSE", respectively. One of the terminals of the lower stage power semiconductor device 3a and one of the terminals of the current sense resistor 4 having a resistance value of R0 [Ω] are connected with the other terminal of the upper stage power semiconductor device 2a; the other terminal of the lower stage power semiconductor device 3a is connected with the ground potential. The lower stage power semiconductor device 3a turns on and off when the switching signal G2 is "TRUE" and "FALSE", respectively.

In Embodiment 2, the upper stage power semiconductor device 2a and the lower stage power semiconductor device 3a are each formed of a semiconductor switching device such as a MOS-FET or an IGBT. Even in the case where as described above, the lower stage power semiconductor device 3a included in the chopper circuit 16a is formed of a MOS-FET, the same operation as in Embodiment 1 can be performed by inputting the switching signal G2 thereto in such a way as described later.

Comparing the case where the lower stage power semiconductor device is formed of a diode with the case where the lower stage power semiconductor device is formed of a MOS-FET, a diode has the advantage of being cheaper than a MOS-FET; in contrast, a MOS-FET has the advantage in that the conduction loss and the heating thereof are smaller than those of a diode.

Figure 5:
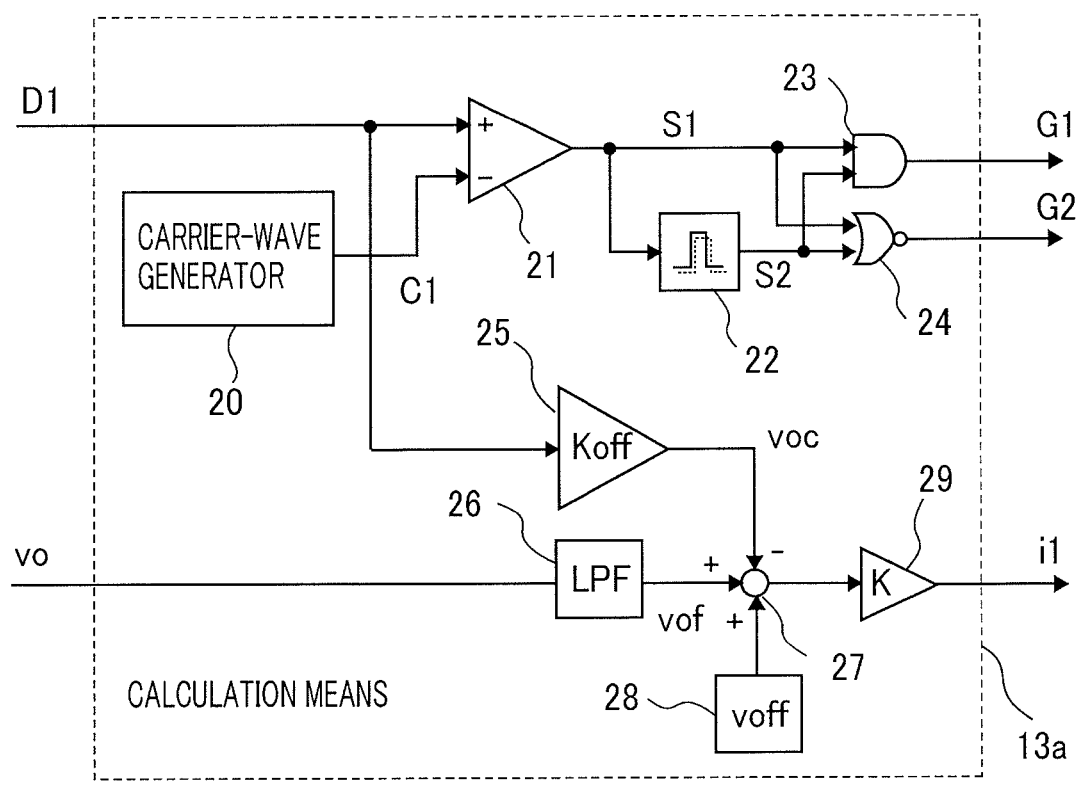
FIG. 5 is a diagram illustrating the internal configuration of a calculation means according to Embodiment 2.

FIG. 5 is a diagram illustrating the internal configuration of the calculation means 13a according to Embodiment 2. The calculation means 13a calculates the switching signals G1 and G2 for turning on or off the upper stage power semiconductor device 2a and the lower stage power semiconductor device 3a, respectively, based on a desired phase width signal D1 obtained from the phase width signal generator 14, calculates the current i0 passing through the current sense resistor 4, based on the differential detection signal vo, and outputs the current i0 as a calculation current i1. In the calculation means 13a, a delay device 22, an AND circuit 23, and a NOR circuit 24 are added to the calculation means 13 of Embodiment 1.

The delay device 22 outputs, as a signal S2, the signal obtained by delaying the signal S1 by a predetermined time Td. The predetermined time Td [sec], which is known as a dead time, is a time for preventing the upper stage power semiconductor device 2a and the lower stage power semiconductor device 3a from simultaneously turning on, causing a short-circuit which produces an excessive current between the first electric potential and the reference electric potential. In Embodiment 2, the delay time Td is set to $5 \times 10^{-6}$ [sec].

The AND circuit 23 calculates the logical multiplication product of the signal S1 and the signal S2 and outputs the product, as the switching signal G1. The NOR circuit 24 calculates the negative OR of the signal S1 and the signal S2 and outputs the negative OR, as the switching signal G2.

Figure 6:
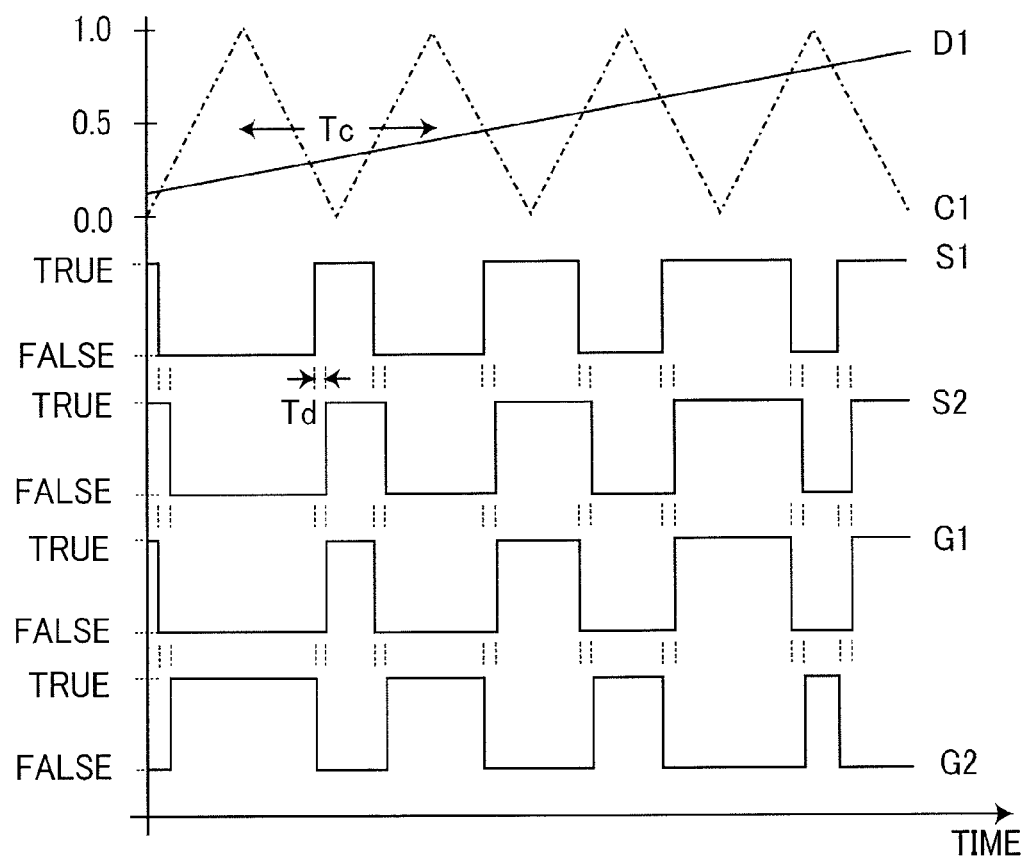
FIG. 6 is a set of charts for explaining the calculation, by the calculation means according to Embodiment 2, of the switching signals G1 and G2 based on a desired phase width signal D1 and a carrier-wave signal C1.

FIG. 6 is a set of charts for explaining the calculation, by the calculation means 13a, of the switching signals G1 and G2 based on a desired phase width signal D1 and a carrier-wave signal C1. In FIG. 6, the top chart represents the waveforms of the phase width signal D1 and the carrier-wave signal C1. The phase width signal D1 ranges from "0" to "1". The carrier-wave signal C1 has the minimum value "0", the maximum value "1", and the cycle Tc. The comparator 21 compares the level of the phase width signal D1 and the level of the carrier-wave signal C1; in the case where D1 C1, the signal S1 becomes "TRUE", and in the case where D1<C1, the signal S1 becomes "FALSE". The signal S2 is a signal obtained by delaying the signal S1 by the predetermined time Td. The switching signal G1 is a signal obtained by calculating the logical multiplication product (AND) of the signal S1 and the signal s2; the switching signal G2 is a signal obtained by calculating the negative OR (NOR) of the signal S1 and the signal s2. By calculating the switching signals G1 and G2 in this way, there is obtained the relationship between the switching signals G1 and G2 that are represented in the fourth top chart and the fifth top chart of FIG. 6. That is to say, the switching signals G1 and G2 alternatively become on, and in order to prevent the switching signals G1 and G2 from simultaneously becoming on, there is provided a duration in which the switching signals G1 and G2 simultaneously become off just for the delay time Td.

As described above, in the electric-power conversion apparatus according to Embodiment 2 of the present invention, the upper stage power semiconductor device and the lower stage power semiconductor device included in the chopper circuit are each formed of a power semiconductor switching device that is turned on or off based on the switching signals G1 and G2, respectively; the same operation and effect as those demonstrated in Embodiment 1 can be obtained also with Embodiment 2.

Embodiment 3

In the calculation means 13a of Embodiment 2, the calculation current i1 is continuously updated; however, the calculation means 13a may be replaced by a calculation means in which the calculation current i1 is discretely updated at an arbitrary timing.

Figure 7:
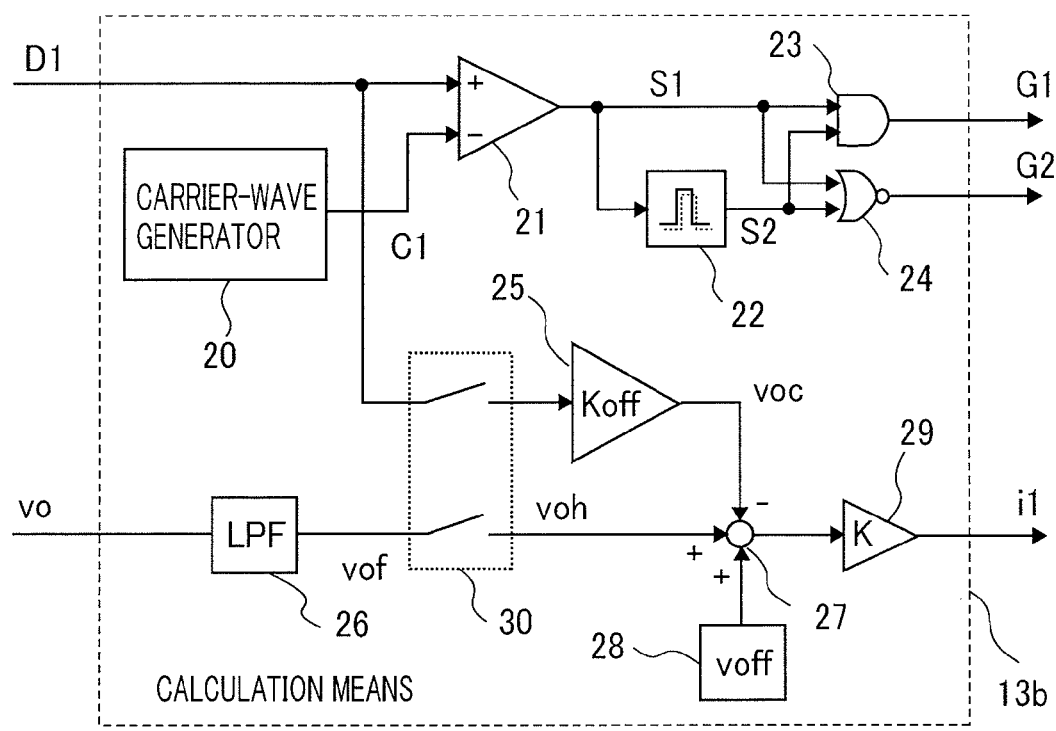
FIG. 7 is a diagram illustrating the internal configuration of a calculation means according to Embodiment 3 of the present invention.

FIG. 7 is a diagram illustrating the internal configuration of a calculation means 13b according to Embodiment 3 of the present invention; in the drawing, the same reference characters as those in Embodiment 2 denote the same or similar constituent elements.

In FIG. 7, a holder 30 holds the phase width signal D1 and the output vof of the lowpass filter 26 at an arbitrary timing and outputs a signal voh. The calculation means 13b is the same as the calculation means 13a of Embodiment 2, excluding the holder 30. Because both the phase width signal D1 and the output vof of the lowpass filter 26 continuously change, no restriction is imposed on the timing when the holder 30 performs holding operation; thus, the calculation current i1 is discretely updated at an arbitrary timing.

In such conventional electric-power conversion apparatuses as disclosed in Patent Documents 1 and 2, in the case where the calculation current is discretely updated, there is imposed restriction that the differential detection signal should be held in synchronization with the timing when the lower stage semiconductor device in the chopper circuit turns on, because values at a time when no current is supplied to the current sense resistor may be held; however, in an electric-power conversion apparatus according to Embodiment 3, there exists no such restriction, and the calculation means 13b may analogue/digital-convert the signal vof and the phase width signal D1 asynchronously with the carrier-wave signal C1. As a result, an accurate current detection value can be obtained even with an inexpensive holder whose holding timing is inaccurate.

Embodiment 4

In each of the foregoing embodiments, the calculation means obtains the correction amount for the calculation current i1, based on the phase width signal; however, the calculation means may be replaced by a calculation means that obtains the correction amount for the calculation current i1, based on the switching signals G1 and G2 or the signal S1 outputted by the comparator 21.

Figure 8:
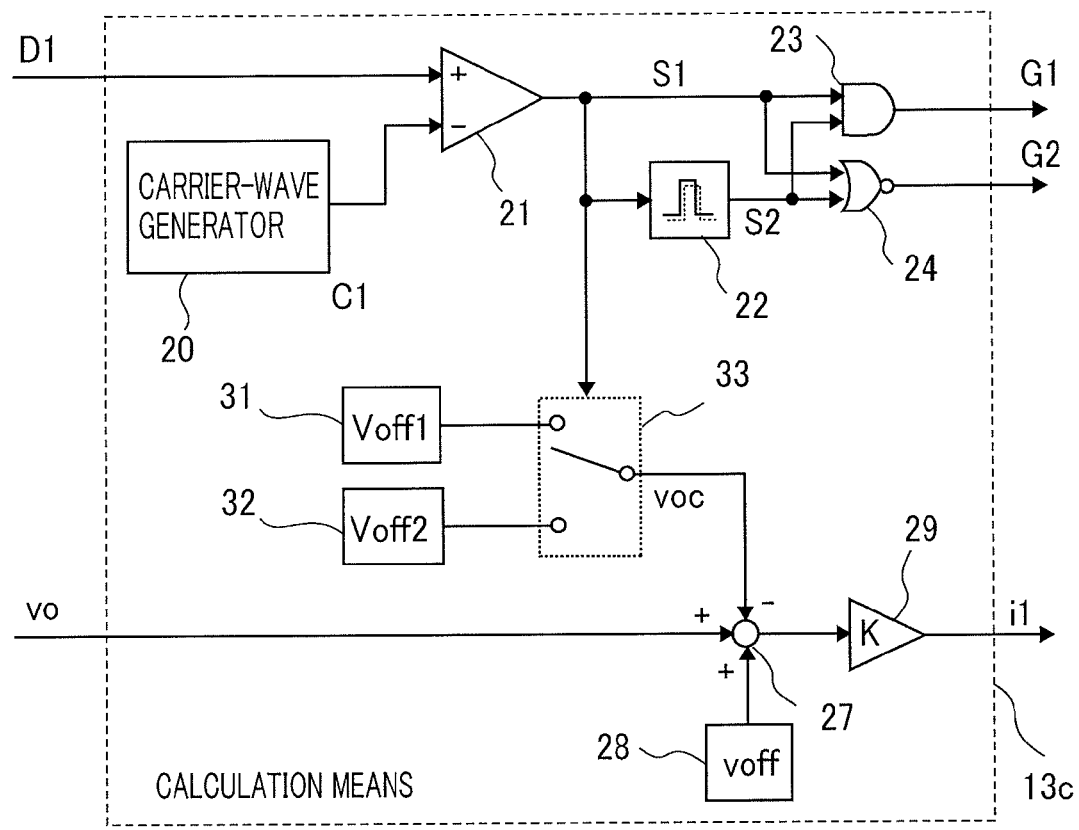
FIG. 8 is a diagram illustrating the internal configuration of a calculation means according to Embodiment 4 of the present invention.

FIG. 8 is a diagram illustrating the internal configuration of a calculation means 13c according to Embodiment 4 of the present invention; in the drawing, the same reference characters as those in Embodiments 1 and 3 denote the same or similar constituent elements.

In FIG. 8, a first correction amount setter 31 outputs a first correction amount voff1; a second correction amount setter outputs a second correction amount voff2. A selector 33 outputs, as the corrected signal voc, the first correction amount voff1 in the case where the signal S1 is "TRUE", and outputs the second correction amount voff2 in the case where the signal S1 is "FALSE".

Figure 9:
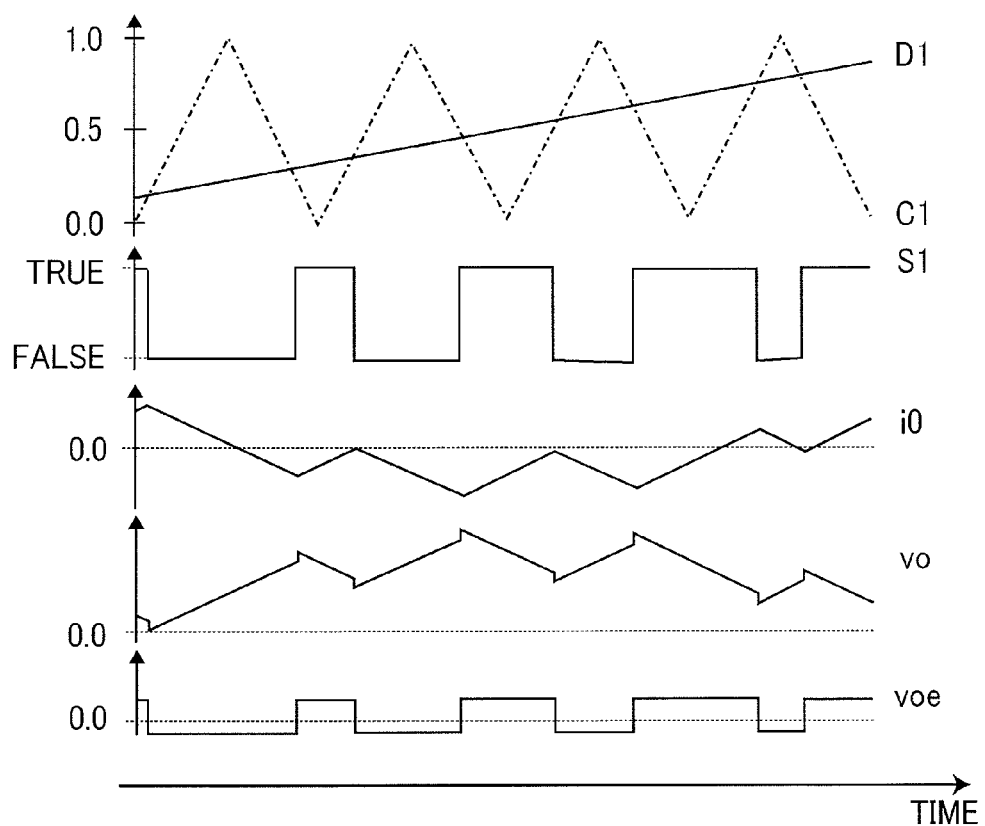
FIG. 9 is a set of charts representing the relationship among the time and the respective signals in the calculation means according to Embodiment 4.

FIG. 9 is a set of charts representing the relationship among the time and the respective signals in the calculation means 13c according to Embodiment 4. In FIG. 9, the top chart represents the phase width signal D1 and the carrier-wave signal C1; the second top chart represents the signal S1; the third top chart represents the current i0; the fourth top chart represents the differential detection signal vo; the bottom chart represents the differential detection signal error voe. The second electric potential v2 is equal to the first electric potential v1 when the upper stage power semiconductor device 2 is on, and is equal to the reference electric potential when the lower stage power semiconductor device 3 is on. In other words, if the delay time Td is neglected, the second electric potential v2 is equal to the first electric potential v1 when the signal S1 is "TRUE", and is equal to the reference electric potential when the signal S1 is "FALSE". Accordingly, in the case where the foregoing equation (8) is satisfied with regard to the differential detection signal error voe, two cases, i.e., the case where the signal S1 is "TRUE" and the case where the signal S1 is "FALSE" may be taken into consideration with regard to the differential detection signal error voe.

In the case where the signal S1 is "TRUE", the second electric potential v2 is equal to the first electric potential v1; therefore, the differential detection signal error voe is (K2×v1), which is obtained by substituting v1 for v2 in the equation (8). In the case where the signal S1 is "FALSE", the second electric potential v2 is equal to the reference electric potential; therefore, the differential detection signal error voe is "0" (=K2×0), which is obtained by substituting "0" for v2 in the equation (8).

Thus, the first correction amount setter 31 is set in such a way as to output K2×v1 and the second correction amount setter 32 is set in such a way as to output "0", so that the selector 33 can output the accurate corrected signal voc.

The signals S1 and S2 and the switching signals G1 and G2 are in the relationship represented in FIG. 6, and, in general, the delay time Td is negligible; thus, in the case where as the input of the selector 33, any one of the switching signals G1 and G2 and the signal S2 is utilized instead of the signal S1, the same effect can be demonstrated.

As the setting values for the first correction amount voff1 and the second correction amount voff2, the values of the offset signal voff outputted by the offset setter 28 is incorporated, so that the offset setter 28 can be omitted. The first correction amount voff1 is a correction amount at a time when the second electric potential v2 is equal to the first electric potential v1. In the case where the first electric potential v1 is a constant value, the first correction amount voff1 may be set to be constant; however, it goes without saying that in the case where the first electric potential v1 changes, the first correction amount voff1 may be made to change in accordance with the first electric potential v1.

As described above, in the calculation means 13c according to Embodiment 4 of the present invention, one of the first correction amount and the second correction amount is selected in accordance with whether or not the switching signals G1 and G2 turns on or off; therefore, there is demonstrated an effect that the calculation of a correction amount, which is implemented every phase width signal D1, is omitted, and accurate current calculation can be performed with only two correction amounts.

Embodiment 5

In the calculation means 13c of Embodiment 4, the calculation current i1 is continuously updated; however, the calculation means 13c may be replaced by a calculation means in which the calculation current i1 is discretely updated.

Figure 10:
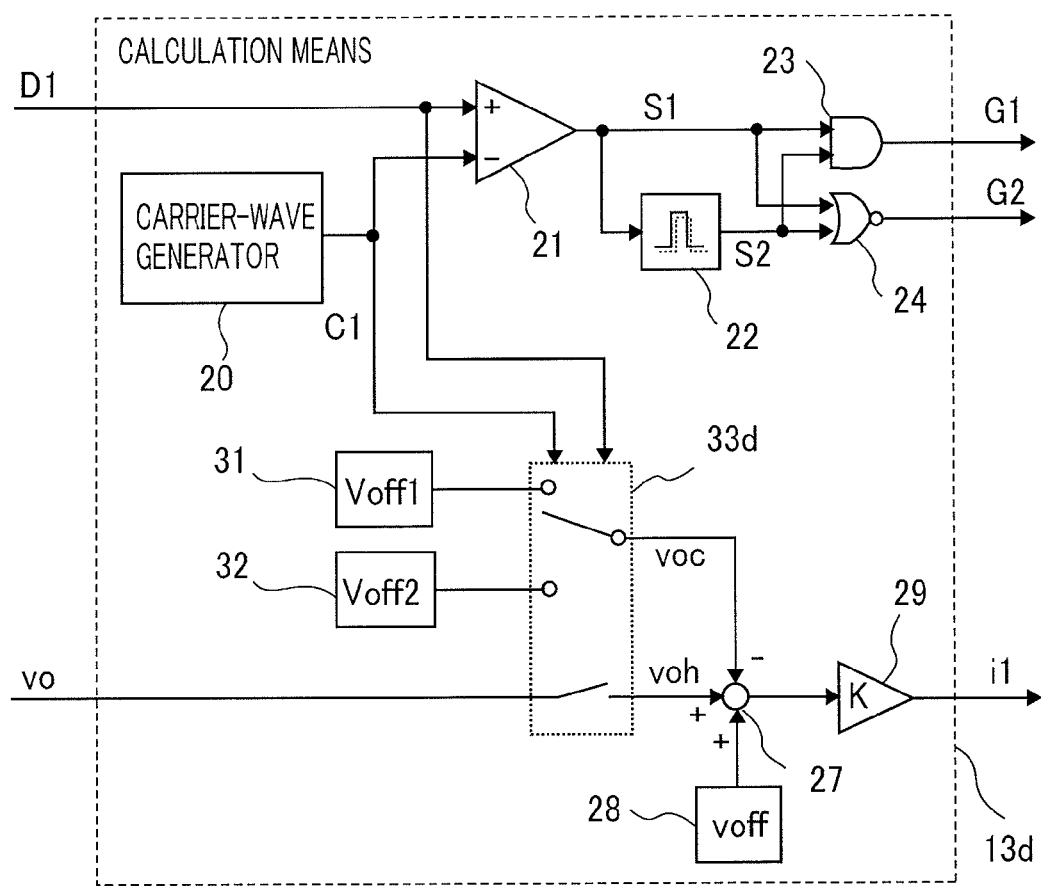
FIG. 10 is a diagram illustrating the internal configuration of a calculation means according to Embodiment 5 of the present invention.

FIG. 10 is a diagram illustrating the internal configuration of a calculation means 13d according to Embodiment 5 of the present invention; in the drawing, the same reference characters as those in Embodiment 4 denote the same or similar constituent elements.

In FIG. 10, a selector 33d holds the differential detection signal vo at a timing described later, based on the phase width signal D1 and the carrier-wave signal C1, and outputs the differential detection signal vo, as the signal voh; concurrently, the selector 33d selects one of the first correction amount voff1 and the second correction amount voff2 and outputs it, as the corrected signal voc.

Figure 11:
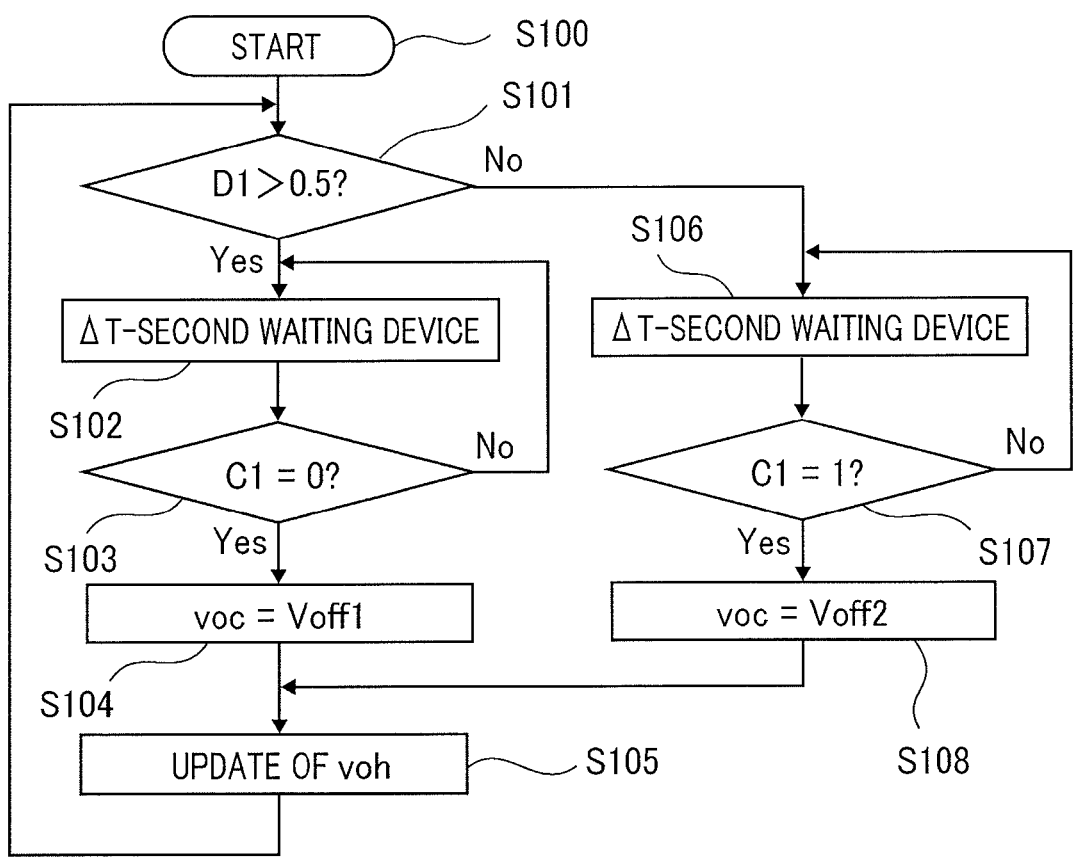
FIG. 11 is a flowchart representing the operation of a selector according to Embodiment 5.

FIG. 11 is a flowchart representing the operation of the selector 33d. In the step S100, the selector 33d starts its operation. In the step S101, it is determined whether or not the phase width signal D1 is larger than 0.5. In the case where it is determined that the phase width signal D1 is larger than 0.5, the selector 33d waits for ΔT seconds in the step S102. In Embodiment 5, ΔT [sec] is set in such a way that the value that is integer-fold as large as ΔT is equal to the half cycle Tc/2 [sec] of the carrier-wave signal C1. In addition, it is desirable that ΔT [sec] is set to be integer-fold as large as the half cycle Tc/2 [sec] of the carrier-wave signal C1; however, ΔT may not be integer-fold as large as the half cycle Tc/2 [sec] of the carrier-wave signal C1, as long as ΔT is the same as or smaller than Tc/2. In the step S103, it is determined whether or not the carrier-wave signal C1 is "0". In the case where the carrier-wave signal C1 is "0", the first correction amount voff1 is selected, as the corrected signal voc, in the step S104; then, in the step S105, the signal voh is updated and becomes the signal vo at a time point when the carrier-wave signal C1 is "0". In the case where it is determined, in the step S103, that the carrier-wave signal C1 is not "0", the process of the step S102 is implemented. In the case where it is determined, in the step S101, that the phase width signal D1 is the same as or smaller than 0.5, the selector 33d waits for ΔT seconds in the step S106.

In the step S107, it is determined whether or not the carrier-wave signal C1 is "1". In the case where the carrier-wave signal C1 is "1", the second correction amount voff2 is selected, as the corrected signal voc, in the step S108; then, in the step S105, the signal voh is updated and becomes the signal vo at a time point when the carrier-wave signal C1 is "1". In the case where it is determined, in the step S107, that the carrier-wave signal C1 is not "1", the process of the step S106 is implemented.

According to the flowchart in FIG. 11, in the case where the phase width signal D1 is larger than 0.5, the differential detection signal is held at a timing when the carrier-wave signal C1 becomes "0" (when the triangular-shaped carrier-wave signal C1 is an extreme bottom); in the case where the phase width signal D1 is the same as or smaller than 0.5, the differential detection signal is held at a timing when the carrier-wave signal C1 becomes "1" (when the triangular-shaped carrier-wave signal C1 is a peak).

Figure 12:
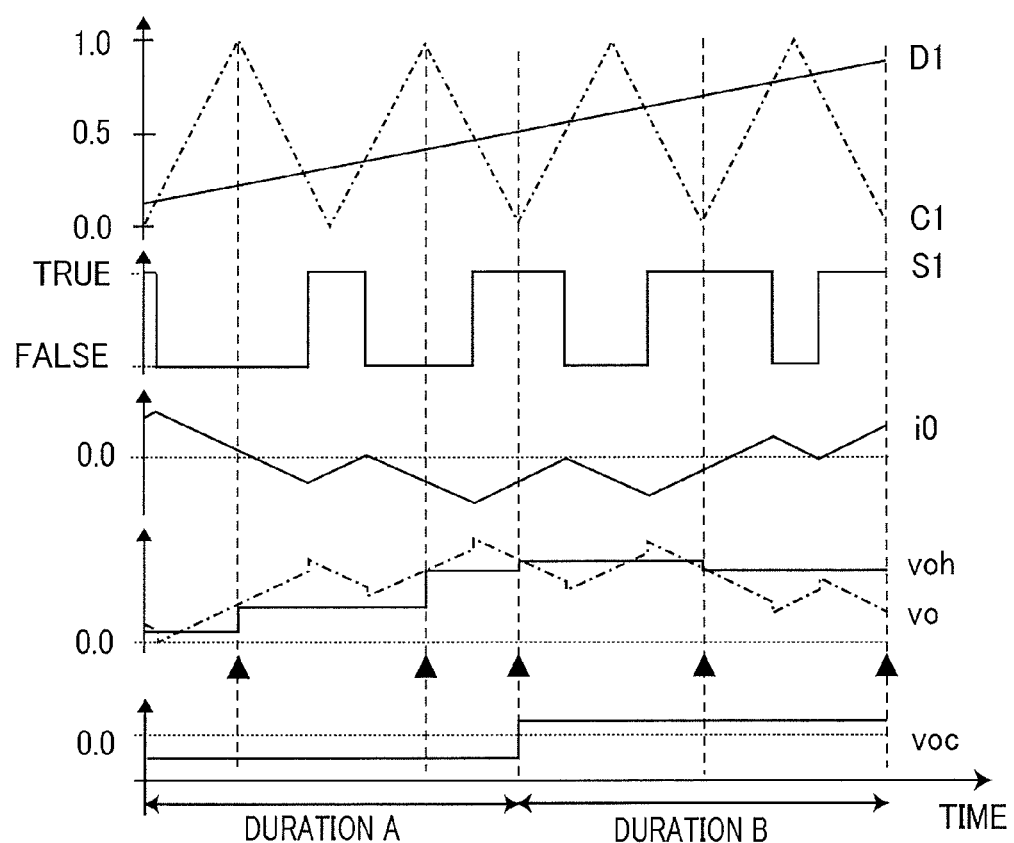
FIG. 12 is a set of charts representing the relationship among the time and the respective signals in Embodiment 5.

FIG. 12 is a set of charts representing the relationship among the time and the respective signals in Embodiment 5. In FIG. 12, the top chart represents the phase width signal D1 and the carrier-wave signal C1; the second top chart represents the signal S1; the third top chart represents the current i0; the fourth top chart represents the differential detection signal vo and the held signal voh; the bottom chart represents the corrected signal voc. In a duration, the phase width signal D1 is the same as or smaller than 0.5; in a duration B, the phase width signal D1 is larger than 0.5.

In the duration A where the phase width signal D1 is the same as or smaller than 0.5, the differential detection signal vo is held at a timing when the carrier-wave signal C1 becomes "1", i.e., when the triangular-shaped carrier-wave signal C1 is a peak, and then is outputted as the signal voh. Then, in the duration A, the second correction amount voff2 is selected and is outputted as the corrected signal voc.

In the duration B where the phase width signal D1 is larger than 0.5, the differential detection signal vo is held at a timing when the carrier-wave signal C1 becomes "0", i.e., when the triangular-shaped carrier-wave signal C1 is an extreme bottom, and then is outputted as the signal voh. Then, in the duration B, the first correction amount voff1 is selected and is outputted as the corrected signal voc.

In the duration A where the phase width signal D1 is the same as or smaller than 0.5, the FALSE duration of the signal S1 is longer than the TRUE duration thereof; at the timing when the carrier-wave signal C1 is "1", the signal S1 is FALSE. In the duration B where the phase width signal D1 is larger than 0.5, the FALSE duration of the signal S1 is shorter than the TRUE duration thereof; at the timing when the carrier-wave signal C1 is "0", the signal S1 is TRUE. With such operation as described above, the differential detection signal vo is held while the signal S1 is TRUE in the duration B where the TRUE pulse duration of the signal S1 is longer than the FALSE pulse duration thereof or while the signal S1 is FALSE in the duration A where the TRUE pulse duration of the signal S1 is shorter than the FALSE pulse duration thereof, so that the signal voh is obtained.

With such a configuration as described above, in the calculation means 13d according to Embodiment 5, in the case where the phase width signal D1 is larger than 0.5, the differential detection signal vo is held during the duration where the upper stage power semiconductor device 2a is on, i.e., where the signal S1 is TRUE. In the case where the phase width signal D1 is the same as or smaller than 0.5, the differential detection signal vo is held during the duration where the lower stage power semiconductor device is on, i.e., where the signal S1 is FALSE. As a result, the differential detection signal vo is held always during the duration where the signal S1 maintains TRUE longer than FALSE or where the signal S1 maintains FALSE longer than TRUE. In other words, it is not required to hold the differential detection signal vo when TRUE and FALSE alternate with each other in a short time; therefore, even when the holding timing is slightly displaced from the peak or the extreme bottom of the triangular-shaped carrier-wave signal C1, the state of the signal S1 does not change.

In the conventional electric-power conversion apparatus in each of foregoing Patent Documents 1 and 2, it is required to hold the differential detection signal at a timing when the lower stage power semiconductor device becomes on; however, when the phase width signal D1 approaches to "1", the duration where the lower stage power semiconductor device is on is short; thus, there has been a problem that there is required a high-accurate holding timing for the differential detection signal. In the electric-power conversion apparatus according to Embodiment 5, it is not required to hold the differential detection signal vo when TRUE and FALSE alternate with each other in a short time; therefore, because the tolerance range of the holding timing for the differential detection signal vo becomes wide, a current value can be obtained even with an inexpensive circuit that produces a delay time caused through processing.

In Embodiment 5, as an example, there has been described a case where in the step S101, the branch condition for the phase width signal D1 is set to 0.5; however, it goes without saying that the branch condition for the phase width signal D1 may be a numerical value other than 0.5, as long as it is in the range between "0" and "1".

Embodiment 6

In the calculation means 13d in Embodiment 5, by holding the differential detection signal vo, the calculation current i1 is outputted; however, the calculation means 13d may be replaced by a calculation means in which instead of the differential detection signal vo, the signal vof obtained by applying a lowpass filter to the differential detection signal vo is held.

Figure 13:
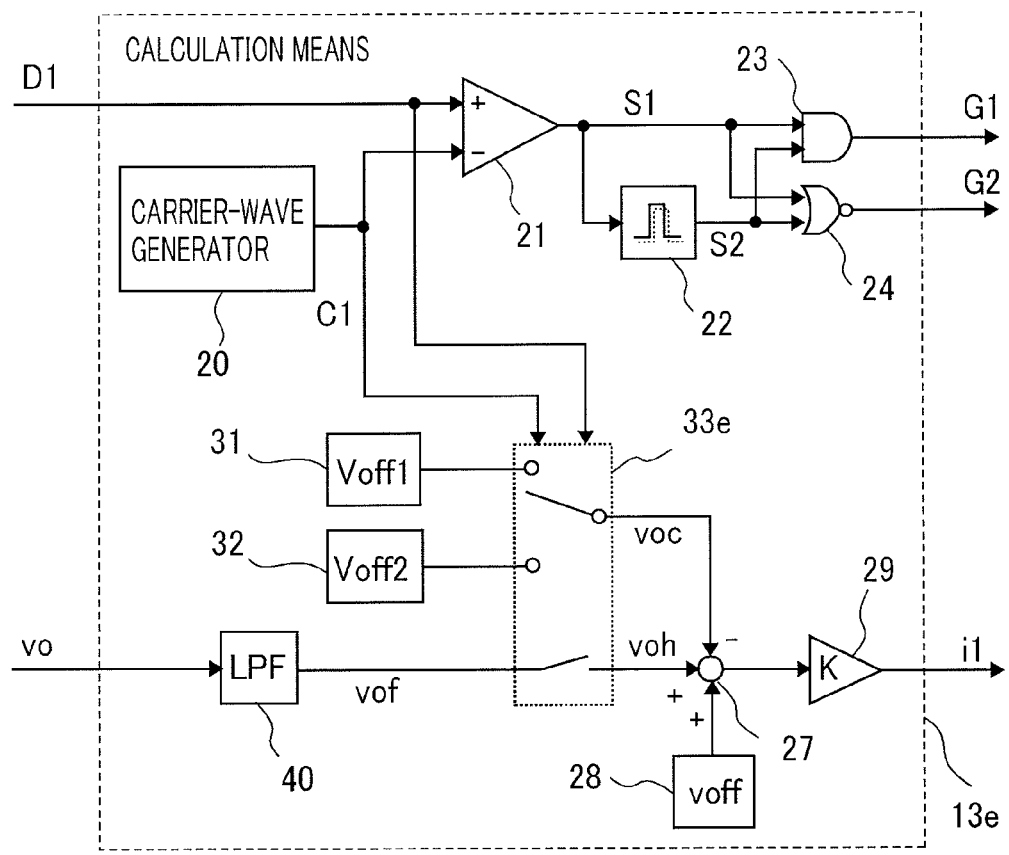
FIG. 13 is a diagram illustrating the internal configuration of a calculation means according to Embodiment 6 of the present invention.

FIG. 13 is a diagram illustrating the internal configuration of a calculation means 13e according to Embodiment 6 of the present invention; in the drawing, the same reference characters as those in Embodiment 5 denote the same or similar constituent elements.

In FIG. 13, a lowpass filter 40 applies filtering with a time constant described later to the differential detection signal vo and inputs the result, as the signal vof, to a selector 33e. The selector 33e holds the signal vof at a timing described later, based on the phase width signal D1 and the carrier-wave signal C1, and outputs the signal vof, as the signal voh; concurrently, the selector 33e selects one of the first correction amount voff1 and the second correction amount voff2 and outputs it, as the corrected signal voc.

Figure 14:
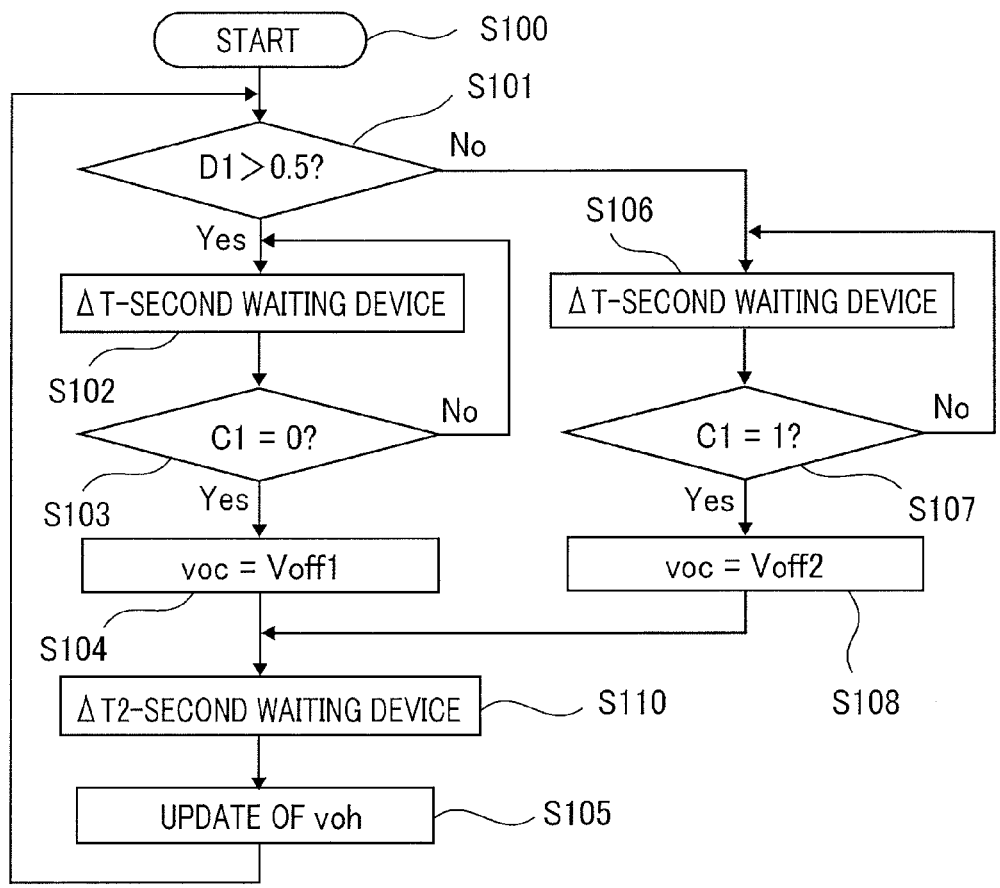
FIG. 14 is a flowchart representing the operation of a selector according to Embodiment 6.

FIG. 14 is a flowchart representing the operation of the selector 33e; in the drawing, the same reference characters as those in Embodiment 5 denote the same or similar constituent elements.

After the processing of the step S104 or the step S108, the selector 33e waits for ΔT2 [sec] in the step S110. Through the step S110, the signal voh from the selector 33e is updated at a timing that is ΔT2 behind the timing of the peak or the extreme bottom of the triangular-shaped carrier-wave signal C1. ΔT2 is set to be a value ranging from "0" to a quarter of the cycle of the carrier-wave signal C1, i.e., Tc/4 [sec]. In particular, in the case where ΔT2 is 0 [sec], the selector 33e becomes the same as the selector 33d.

Figure 15:
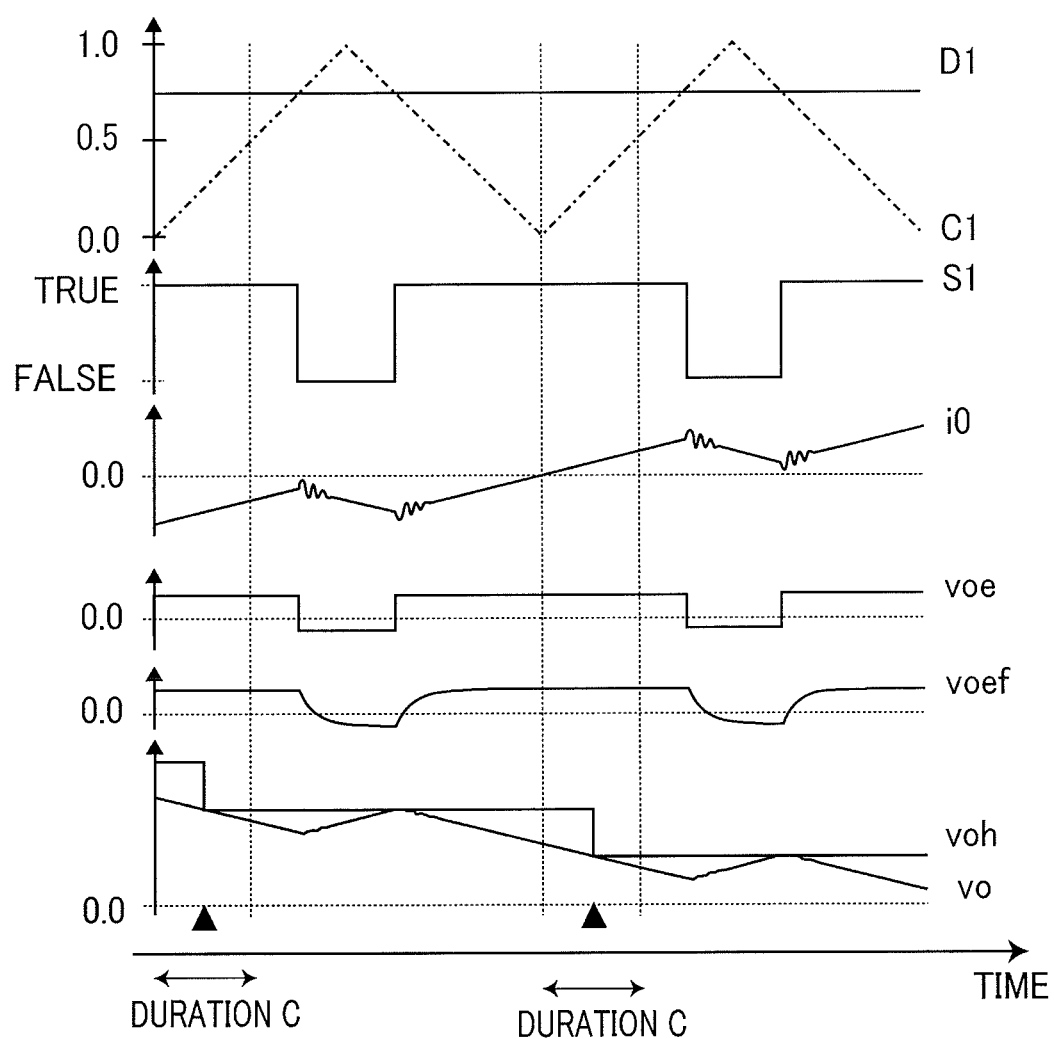
FIG. 15 is a set of charts representing the relationship among the time and the respective signals in Embodiment 6.

FIG. 15 is a set of charts representing the relationship among the time and the respective signals in Embodiment 6. In FIG. 15, the top chart represents the phase width signal D1 and the carrier-wave signal C1; the second top chart represents the signal S1; the third top chart represents the current i0; the fourth top chart represents the differential detection signal error voe, the fifth top chart represents the signal voef obtained by filtering the differential detection signal error voe with a filter having a time constant the same as that of the lowpass filter 40, and the bottom chart represents the differential detection signal vo and the signal voh obtained through holding. As represented in the third top chart of FIG. 15, an oscillation, which is called ringing, occurs in the current i0 at a timing when the signal S1 changes, i.e., at a timing when the power semiconductor device turns on or off. If the selector holds a signal at a timing when the ringing exists, the ringing causes an error in the calculation current i1 outputted by the calculation means. The lowpass filter 40 in Embodiment 6 operates in such a way as to eliminate the effect of the ringing.

Here, the time constant of the lowpass filter 40 will be considered. The fourth top chart of FIG. 15 represents the differential detection signal error voe; the fifth top chart represents the waveform of the signal voef obtained by filtering the differential detection signal error voe with a filter having a time constant the same as that of the lowpass filter 40. As represented in FIG. 15, in the case where the phase width signal D1 is larger than 0.5, the selector 33e holds the signal vof, as described above, at a timing ΔT2 [sec] behind the timing when the triangular-shaped carrier-wave signal C1 is an extreme bottom. ΔT2 is set to be a value ranging from 0 [sec] to a quarter of the cycle of the carrier-wave signal C1, i.e., Tc/4 [sec]; therefore, the selector 33e holds the signal vof at a given timing within the duration C in FIG. 15. In other words, by changing ΔT2 within a range from "0" to Tc/4 [sec], the signal vof is held at an arbitrary timing within the duration C in the FIG. 15; in the example represented in FIG. 15, by setting ΔT2 to Tc/8 [sec], the signal vof is held at the timing indicated by the mark "▲".

In the case where the phase width signal D1 is larger than 0.5 and the error voef included in the signal vof held by the selector 33e is a value corresponding to the first correction amount voff1, the first correction amount voff1 is an appropriate value, as the correction amount selected by the selector 33e. As can be seen from the fifth top chart of FIG. 15, in the case where the phase width signal D1 is larger than 0.5, the signal vof is held during a duration in which the signal S1 is TRUE; thus, the signal voef takes a value existing in a duration between 0 [sec] and Tc/2 [sec] from a timing when the signal S1 changes from FALSE to TRUE. Therefore, the time constant of the lowpass filter 40 may be set to be the same as or smaller than half of the cycle of the carrier-wave signal C1. In addition, by setting the time constant of the lowpass filter 40 to be the same as or larger than 1/20 times as large as the cycle of the carrier-wave signal C1, the change of vo with regard to the carrier-wave signal C1 can sufficiently be recognized. That is to say, the time constant of the lowpass filter 40 may be set to be between 1/20 times as large as the cycle of the carrier-wave signal C1 and half of the cycle of the carrier-wave signal C1.

In particular, by holding the signal vof during the duration C, the signal voef takes a value existing in a duration between Tc/4 [sec] and Tc/2 [sec] from a timing when the signal S1 changes from FALSE to TRUE. In other words, because the duration in which the selector 33e is allowed to hold the signal vof is the same as or longer than half of the cycle of the carrier-wave signal, even when there is provided a filter having a time constant between a quarter and half of the cycle of the carrier-wave signal C1, the differential detection signal error voe is in a steady state at a holding timing; thus, it is desirable. As a result, it is made possible to suppress detection noise caused by a ringing or the like; therefore, the first correction amount voff1 is an appropriate value, as the correction amount selected by the selector 33e.

Such a conventional electric-power conversion apparatus as disclosed in Patent Documents 1 and 2 is configured in such a way that the differential signal is held at the timing when the lower stage power semiconductor device becomes on; therefore, in such a case as represented in FIG. 15, a current is supplied to the current sense resistor only the duration when the signal S1 is FALSE. Thus, the holding duration is equal to the duration when the signal S1 is FALSE. As the phase width signal D1 approaches more to "1", the duration of FALSE becomes shorter. As the range of the phase width signal D1 is situated higher, the utilization rate of the electric-power conversion apparatus becomes higher; For the ordinary application, it is desired to ensure the utilization rate of 0.95 or higher. In this case, the duration in which the signal S1 is FALSE becomes $1/20$ times as long as the cycle of the carrier-wave signal. Accordingly, in the case where there is provided a filter having a time constant between $1/20$ of the cycle of the carrier-wave signal and half of the cycle of the carrier-wave signal, the differential detection signal error voe is held when it is in the transient state; therefore, as the correction amount selected by the selector 33e, two kinds of correction amounts, for example, the first correction amount voff1 and the second correction amount voff2 cannot be given. As a result, there cannot be demonstrated the effect of suppressing noise caused by a ringing or the like.

However, in the electric-power conversion apparatus according to Embodiment 6, the calculation current i1 is calculated based on the value vof obtained by applying a filter having a time constant between approximately $1/20$ of the cycle of the carrier-wave signal C1 and approximately half of the cycle of the carrier-wave signal C1 to the differential detection signal vo; therefore, without undergoing the effect of noise caused by a ringing or the like, the stable and accurate calculation current i1 can be calculated.

Embodiment 7

In Embodiment 6, the calculation means is provided with the first correction amount and the second correction amount, selects, as the correction amount for calculating the calculation current i1, one of the first correction amount and the second correction amount in accordance with on/off of the switching signals G1 and G2, and performs addition and correction; however, in the case where the voltage drop generated in the power semiconductor device is approximately in proportion to the current, the electric potential v2, i.e., the differential detection signal error voe changes in accordance with the current that passes through the power semiconductor device. In the case where the voltage drop generated in the power semiconductor device is approximately in proportion to the current, it is reflected in such a way that the amplification factor of the differential detection signal vo to the current i0 changes. In the case where as the upper stage power semiconductor device and the lower stage power semiconductor device, different types of power semiconductor devices are utilized, the coefficient of the proportion relationship between the voltage drop generated in the power semiconductor device and the current i0 differs depending on the on/off state of the switching signals G1 and G2. Accordingly, it may be allowed that one of the third correction amount and the fourth correction amount is selected in accordance with the signal S1 that changes in synchronization with on/off of the switching signals G1 and G2 and then multiplication and correction are performed.

Figure 16:
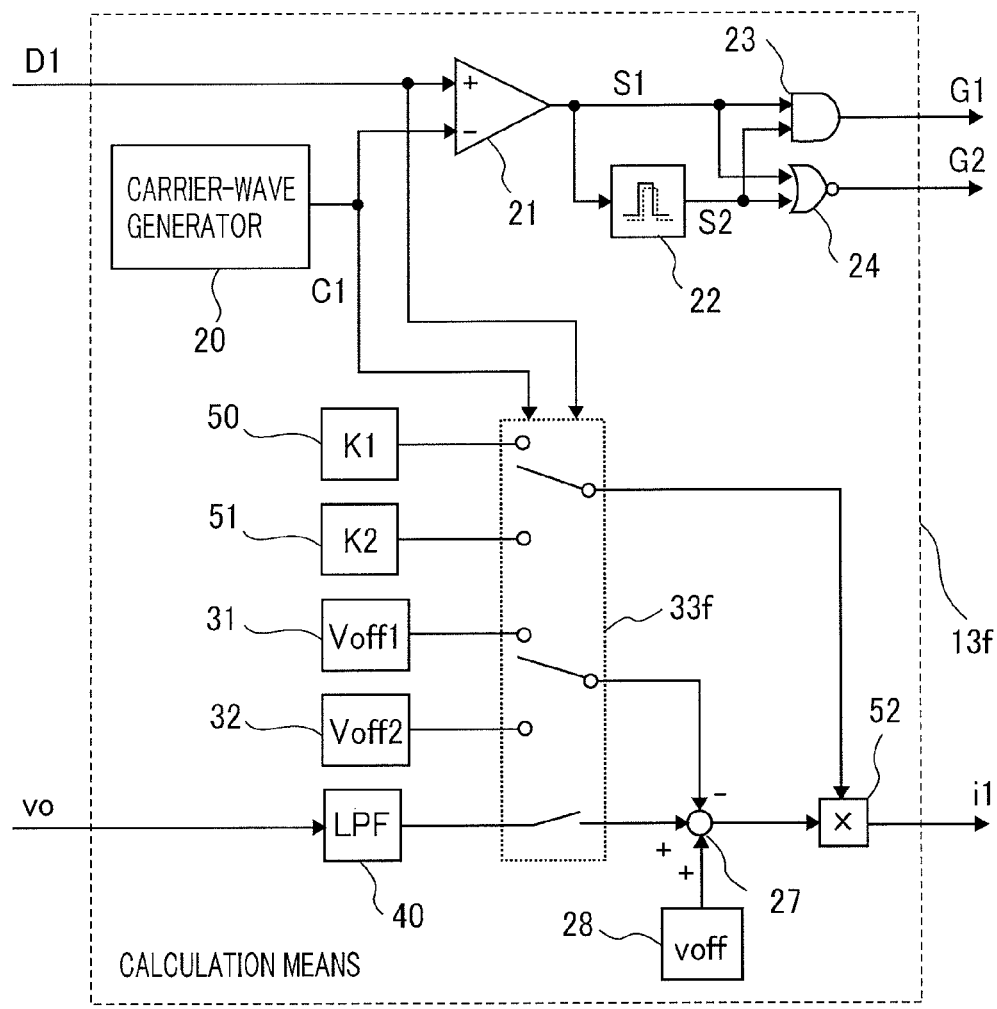
FIG. 16 is a diagram illustrating the internal configuration of a calculation means according to Embodiment 7 of the present invention.

FIG. 16 is a diagram illustrating the internal configuration of a calculation means 13f according to Embodiment 7 of the present invention; in the drawing, the same reference characters as those in Embodiment 6 denote the same or similar constituent elements.

In the calculation means 13e of Embodiment 6, the gain calculator 29 multiplies the output of the adder-subtractor 27 by "K". The calculation means 13f of Embodiment 7 is provided with a third correction amount setter 50 that outputs a third correction amount K1 and a fourth correction amount setter 51 that outputs a fourth correction amount K2.

When selecting the first correction amount voff1, as the correction amount to be outputted and inputted to the adder-subtractor 27, a selector 33f selects the third correction amount K1, as the correction amount to be outputted and inputted to a multiplier 52; when selecting the second correction amount voff2, as the correction amount to be outputted and inputted to the adder-subtractor 27, the selector 33f selects the fourth correction amount K2, as the correction amount to be outputted and inputted to the multiplier 52.

As described above, as the correction amount for calculating the calculation current i1, the third correction amount K1 and the fourth correction amount K2 for correcting the calculation current i1 in a multiplication manner are added to voff1 and voff2 for correcting the calculation current i1 in an addition manner, so that the calculation current i1 can more accurately be calculated.

Embodiment 8

In the foregoing embodiments, there has been described the differential detection circuit 6 in which a single operational amplifier plays the roles of differential detection and signal amplification; however, the differential detection circuit 6 may be replaced by a differential detection circuit 6g in which there are provided two operational amplifiers that play the roles of differential detection and signal amplification.

Figure 17:
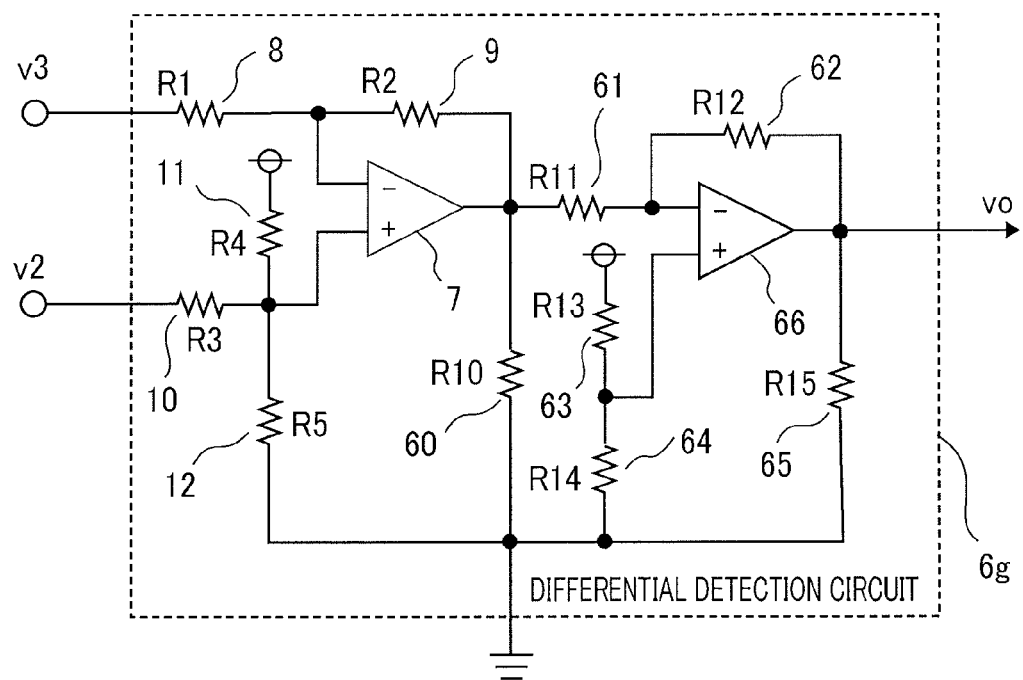
FIG. 17 is a diagram illustrating the internal configuration of a differential detection circuit according to Embodiment 8 of the present invention.

FIG. 17 is a diagram illustrating the internal configuration of the differential detection circuit 6g according to Embodiment 8 of the present invention; in the drawing, the same reference characters as those in the foregoing embodiments denote the same or similar constituent elements.

In FIG. 17, the differential detection circuit 6g is provided with totally two operational amplifiers, i.e., the operational amplifier 7 that plays the role of differential detection and an operational amplifier 66 that plays the role of signal amplification. The resistors 8 through 12 are selected in such a way that the following equations (9) and (10) are satisfied among the resistance values R1 through R5.

$$R1 = R2 = R3 \quad (9)$$

$$2 \times R1 = R4 = R5 \quad (10)$$

By giving the resistance values R1 through R5 of the resistors 8 through 12 in this manner, the operational amplifier 7 does not amplify the electric potential difference (v3−v2) and hence the differential detection can be performed. The resistance values are only two kinds of values; as the resistors 11 and 12, resistors having a resistance value of R1 are given in such a way that they are connected in series with each other, or as the resistors 8 through 12, resistors having a resistance value of R4 are given in such a way that they are connected in parallel with one another, so that the resistors 8 through 12 can be formed of the same resistors in the same lot. As a result, there can be reduced a detection error produced through in-phase voltages caused by unevenness in the resistance value. By giving the resistance values R10 through R15 of resistors 60 through 65 in an appropriate manner, the operational amplifier 66 can output a value obtained by amplifying the output of the operational amplifier 7 with a desired amplification factor.

As described above, the differential detection circuit according to Embodiment 8 is configured in such a way as to be provided with totally two operational amplifiers, i.e., an operational amplifier that plays the role of differential detection and an operational amplifier that plays the role of signal amplification, the resistors 8 through 12 connected with the operational amplifier that plays the role of differential detection can be formed in the same lot. Because the unevenness in the resistance values of resistors in the same lot is smaller than that in the resistance values of resistors in different lots, the unevenness in the resistance values of the resistors 8 through 12 and the error caused by in-phase voltages can be reduced. As a result, there can be demonstrated an effect that the error in the differential detection signal vo can be reduced.

Embodiment 9

As described above, when being mounted in a vehicle, an electric-power conversion apparatus needs to operate at a severe temperature, at a severe humidity, in a vibration, and in a dusty condition; thus, a current detecting resistor is superior to a hole device as the hole current sensor in terms of robustness. Accordingly, in Embodiment 1, the electric-power conversion apparatus 15 may be configured in such a way that the first electric potential v1 is connected with the positive electrode of the battery 1 mounted in a vehicle, the third electric potential v3 is connected with the electric load 5 mounted in the vehicle, and the reference electric potential GND is earthed to the vehicle body or connected with the negative electrode of the battery 1.

By being configured in this way, the electric-power conversion apparatus 15 can satisfy the limiting conditions with regard to temperature, humidity, vibration, and dust, which should be cleared when mounted in a vehicle, can apply a voltage lower than the battery voltage to the electric load, and can demonstrate an effect of accurately obtaining the value of the current i0 to be supplied to the electric load.

Embodiment 10

In Embodiment 9, there has been dealt with a case where the first electric potential v1 of the electric-power conversion apparatus is connected with the battery and the third electric potential v3 is connected with the electric load; however, the electric-power conversion apparatus may be configured in such a way that the first electric potential v1 is connected with the electric load, the third electric potential v3 is connected with the positive electrode of the battery by way of a coil, and the reference electric potential is earthed to the vehicle body or connected with the negative electrode of the battery.

Figure 18:
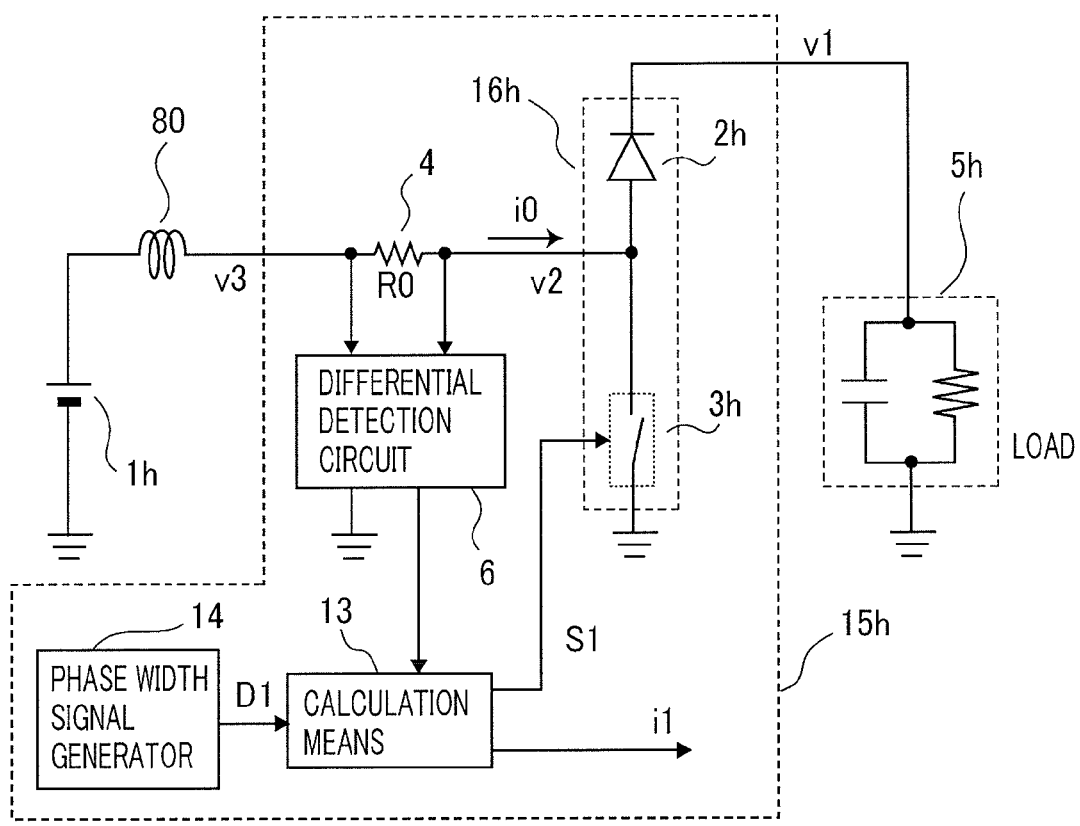
FIG. 18 is a diagram illustrating the overall configuration of an electric-power conversion apparatus according to Embodiment 10 of the present invention.

FIG. 18 is a diagram illustrating the overall configuration of an electric-power conversion apparatus according to Embodiment 10 of the present invention; in the drawing, the same reference characters as those in the foregoing embodiments denote the same or similar constituent elements.

In FIG. 18, an electric-power conversion apparatus 15h is provided with a chopper circuit 16h, the current sense resistor 4, the differential detection circuit 6, the calculation means 13, and the phase width signal generator 14; as the control signals for the chopper circuit 16h, there exist the phase width signal D1 outputted by the phase width signal generator 14 and the switching signal S1 outputted by the calculation means 13.

The phase width signal D1 corresponds to the ratio of the conduction duration of the lower stage power semiconductor device 3h included in the chopper circuit 16h to the non-conduction duration thereof and varies ranging from "0" to "1". A second electric potential v2 becomes equal to the reference electric potential GND during a duration in which the lower stage power semiconductor device 3h is on. An electric load 5h is a load consisting of a capacitor and a resistor that are connected in parallel with each other.

One of the terminals of the current sense resistor 4 is connected with the connection point between the upper stage power semiconductor device 2h and the lower stage power semiconductor device 3h that are included in the chopper circuit 16h; the positive electrode of a DC voltage source 1h is connected with the other terminal of the current sense resistor 4 by way of a coil 80. The first electric potential v1 is the electric potential of the connection point between the chopper circuit 16h and the electric load 5h; the second electric potential v2 is the electric potential of the connection point between the chopper circuit 16h and the current sense resistor 4; the third electric potential v3 is the electric potential of the connection point between the current sense resistor 4 and the coil 80.

The current i0 that passes through the coil 80 always varies continuously; therefore, when the state of the lower stage power semiconductor device 3h changes from "on" to "off", the current i0 is supplied from the second electric potential v2 to the electric load 5h by way of the upper stage power semiconductor device 2h, which is a diode. In Embodiment 10, the upper stage power semiconductor device included in the chopper circuit 16h is formed of a diode, which is a semiconductor rectifier; however, even when the upper stage power semiconductor device is formed of a semiconductor switching device such as a MOS-FET or an IGBT, operation the same as that of Embodiment 10 can be performed, as long as appropriate switching is implemented. Comparing the case where the upper stage power semiconductor device is formed of a MOS-FET with the case where the upper stage power semiconductor device is formed of a diode, a MOS-FET has the advantage in that the conduction loss and the heating thereof are smaller than those of a diode; in contrast, a diode has the advantage of being cheaper than a MOS-FET.

The switching signal S1 is a signal for turning on or off the lower stage power semiconductor device 3h included in the chopper circuit 16h.

With such a configuration as in Embodiment 10, the first electric potential v1 with which the electric load 5h is connected can be made higher than the electric potential of the positive electrode of the DC voltage source 1h. In addition, when being mounted in a vehicle, an electric-power conversion apparatus needs to operate at a severe temperature, at a severe humidity, in a vibration, and in a dusty condition; thus, a current detecting resistor is superior to a hole device as the hole current sensor in terms of robustness. Accordingly, the first electric potential v1 of the electric-power conversion apparatus 15h is connected with the electric load 5h mounted in a vehicle, and by way of the coil 80, the third electric potential v3 is connected with the positive electrode of a battery mounted, as the DC voltage source 1h, in the vehicle, so that the electric-power conversion apparatus can satisfy the limiting conditions with regard to temperature, humidity, vibration, and dust, which should be cleared when mounted in a vehicle, can apply a voltage higher than the electric potential of the positive electrode of the DC voltage source 1h to the electric load 5h, and can demonstrate an effect of accurately obtaining the value of the current i0 to be supplied from the DC voltage source 1h.

Embodiment 11

In each of the foregoing embodiments, there has been dealt with a case where the electric load is formed of a resistor, a coil, or a capacitor; however, the electric load may also be a DC rotating machine.

Figure 19:
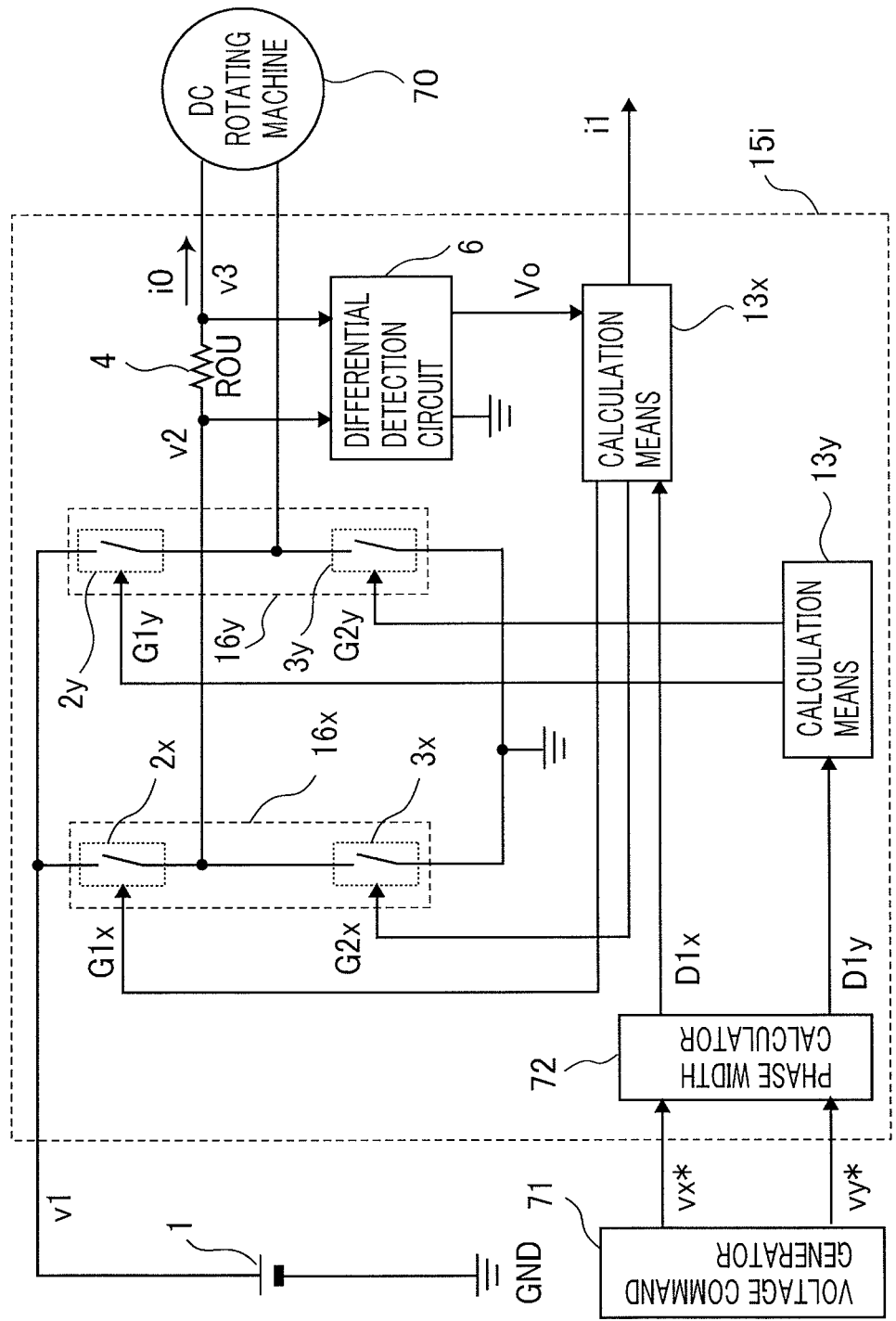
FIG. 19 is a diagram illustrating the overall configuration of an electric-power conversion apparatus according to Embodiment 11 of the present invention.

FIG. 19 is a diagram illustrating the overall configuration of an electric-power conversion apparatus according to Embodiment 11 of the present invention; in the drawing, the same reference characters as those in the foregoing embodiments denote the same or similar constituent elements.

In FIG. 19, the DC voltage source 1, a DC rotating machine 70, and a voltage command generator 71 are connected with an electric-power conversion apparatus 15i. The electric-power conversion apparatus 15i is configured with a first chopper circuit 16x, a second chopper circuit 16y, a phase width calculator 72, the resistor 4, the differential detection circuit 6, a first calculation means 13x, and a second calculation means 13y.

The DC rotating machine 70 has two terminals for the x-phase and the y-phase; the x-phase is connected with the chopper circuit 16x by way of the current sense resistor 4. The y-phase of the DC rotating machine 70 is connected with the chopper circuit 16y. The voltage command generator 71 outputs a command value vx* for a voltage to be applied by the chopper circuit 16x to the x-phase of the DC rotating machine 70 and a command value vy* for a voltage to be applied by the chopper circuit 16y to the y-phase of the DC rotating machine 70.

The command values vx* and each vary from $-0.5 \times v1$ [V] to $+0.5 \times v1$ [V]. The phase width calculator 72 preliminarily stores the electric potential difference v1 between the terminals of the DC voltage source 1 and calculates phase width signals D1x and D1y, based on the following equations (11) and (12).

$$D1x = vx^* \div v1 + 0.5 \quad (11)$$

$$D1y = vy^* \div v1 + 0.5 \quad (12)$$

As can be seen from the range of the command values vx* and vy*, the ranges of the phase width signals D1x and D1y are each from "0" to "1". The calculation means 13x is configured in the same manner as the calculation means 13 described in each of the foregoing embodiments. Based on the phase width signal D1x, the calculation means 13x outputs a switching signal G1x for turning on or off an upper stage power semiconductor device 2x in the first chopper circuit 16x and a switching signal G2x for turning on or off a lower stage power semiconductor device 3x, and calculates the calculation current i1, based on the differential detection signal vo obtained from the differential detection circuit 6.

The calculation means 13y is a calculation means in which the calculation of the calculation current i1 performed in the calculation means 13x is removed; based on the phase width signal D1y, the calculation means 13y outputs a switching signal G1y for turning on or off an upper stage power semiconductor device 2y in the second chopper circuit 16y and a switching signal G2y for turning on or off a lower stage power semiconductor device 3y.

The connection among the chopper circuit 16x, the current sense resistor 4, the differential detection circuit 6, and the calculation means 13x is the same as the connection among the chopper circuit 16, the current sense resistor 4, the differential detection circuit 6, and the calculation means 13; therefore, the chopper circuits in Embodiment 11 can operate in the same principle as the chopper circuit in Embodiment 1 operates. Accordingly, it goes without saying that even in the case where the configuration according to each of Embodiments 2 through 10 is utilized, it is made possible to obtain the calculation current i1 while driving the DC rotating machine 70.

In addition, when being mounted in a vehicle, an electric-power conversion apparatus needs to operate at a severe temperature, at a severe humidity, in a vibration, and in a dusty condition; thus, a current detecting resistor is superior to a hole device as the hole current sensor in terms of robustness. Accordingly, the electric-power conversion apparatus 15i may be configured in such a way that as the DC voltage source 1, there is provided a battery mounted in a vehicle, the first electric potential v1 of the electric-power conversion apparatus 15i is connected with the positive electrode of the battery, the third electric potential v3 of the electric-power conversion apparatus 15i is connected with the DC rotating machine mounted in the vehicle, and the reference electric potential GND is earthed to the vehicle body or connected with the negative electrode of the battery.

By making the connection in this way, it is made possible to obtain an electric-power conversion apparatus that satisfies the limiting conditions with regard to temperature, humidity, vibration, and dust, which should be cleared when mounted in a vehicle, applies a voltage lower than the battery voltage to the DC rotating machine 70, and accurately obtains the value of a current to be supplied to the DC rotating machine 70.

Embodiment 12

In Embodiment 11, there has been dealt with a case where as the electric load, a DC rotating machine is connected; however, the electric load may also be an AC rotating machine.

Figure 20:
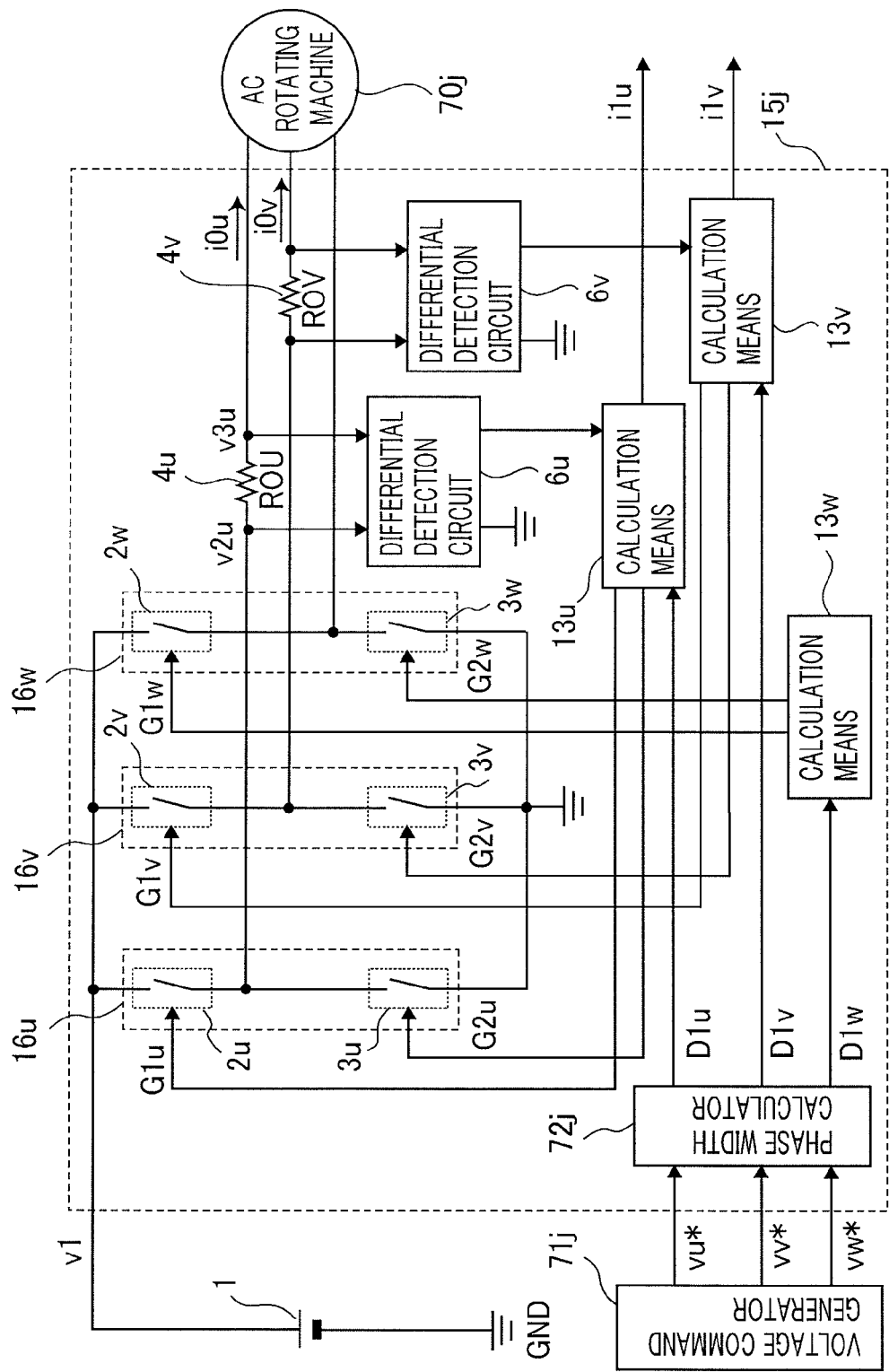
FIG. 20 is a diagram illustrating the overall configuration of an electric-power conversion apparatus according to Embodiment 12 of the present invention.

FIG. 20 is a diagram illustrating the overall configuration of this kind of electric-power conversion apparatus according to Embodiment 12 of the present invention; in the drawing, the same reference characters as those in the foregoing embodiments denote the same or similar constituent elements.

In FIG. 20, the DC voltage source 1, an AC rotating machine 70j, and a voltage command generator 71j are connected with an electric-power conversion apparatus 15j. The electric-power conversion apparatus 15j is configured with a first chopper circuit 16u, a second chopper circuit 16v, a third chopper circuit 16w, a first calculation means 13u, a second calculation means 13v, a third calculation means 13w, a phase width calculator 72j, a first current sense resistor 4u, a second current sense resistor 4v, a first differential detection circuit 6u and a second differential detection circuit 6v.

The connection among the first chopper circuit 16u, the first current sense resistor 4u, the first differential detection circuit 6u, and the first calculation means 13u is the same as the connection among the chopper circuit 16, the current sense resistor 4, the differential detection circuit 6, and the calculation means 13; therefore, the chopper circuit in Embodiment 12 can operate in the same principle as the chopper circuit in Embodiment 1 operates. The same applies to the connection among the second chopper circuit 16v, the second current sense resistor 4v, the second differential detection circuit 6v, and the second calculation means 13v. In addition, the connection between the third chopper circuit 16w and the third calculation means 13w is the same as the connection between the second chopper circuit 16y and the second calculation means 13y in Embodiment 11; therefore, the chopper circuits in Embodiment 12 can operate in the same principle as the chopper circuits in Embodiment 11 operate. Moreover, it goes without saying that when the configuration according to each of Embodiments 2 through 11 is utilized to drive the AC rotating machine 70j, it is made possible to obtain the high-accuracy calculation current i1.

In addition, when being mounted in a vehicle, an electric-power conversion apparatus needs to operate at a severe temperature, at a severe humidity, in a vibration, and in a dusty condition; thus, a current detecting resistor is superior to a hole device as the hole current sensor in terms of robustness.

Accordingly, the electric-power conversion apparatus 15*j* may be configured in such a way that as the DC voltage source 1, there is provided a battery mounted in a vehicle, the first electric potential v1 of the electric-power conversion apparatus 15*j* is connected with the positive electrode of the battery, the third electric potential v3 of the electric-power conversion apparatus 15*j* is connected with the AC rotating machine mounted in the vehicle, and the reference electric potential GND is earthed to the vehicle body or connected with the negative electrode of the battery. By making the connection in this way, it is made possible to obtain an electric-power conversion apparatus that satisfies the limiting conditions with regard to temperature, humidity, vibration, and dust, which should be cleared when mounted in a vehicle, applies a voltage lower than the battery voltage to the AC rotating machine 70*j*, and accurately obtains the value of a current to be supplied to the AC rotating machine 70*j*. In addition, in Embodiment 12, there has been dealt with a case where there are detected currents of two phases among the currents of three phases of the AC rotating machine 70*j*; however, it goes without saying that in order to detect the respective currents of the three phases, the respective detection resistors and differential detection circuits of the three phases may be provided.

What is claimed is:

1. An electric-power conversion apparatus comprising:
a chopper circuit;
a current sense resistor that detects a first output current of the chopper circuit;
a differential detection circuit that outputs, as a differential detection signal, an electric potential difference across the current sense resistor; and
a calculation means that corrects the differential detection signal from the differential detection circuit by use of a control signal so as to calculate a second output current of the chopper circuit;
wherein the calculation means calculates a switching signal for turning on or off the chopper circuit based on a phase width signal, which is the control signal for the chopper circuit, and calculates the second output current of the chopper circuit based on the differential detection signal;
wherein the chopper circuit is configured with an upper stage power semiconductor device connected between a first electric potential and a second electric potential and a lower stage power semiconductor device connected between the second electric potential and a reference electric potential;
wherein the current sense resistor is connected between the second electric potential and a third electric potential;
wherein the differential detection circuit detects the electric potential difference between the second electric potential and the third electric potential,
wherein the calculation means is provided with a first correction amount and a second correction amount and selects, as a correction amount for calculating the second output current of the chopper circuit, one of the first correction amount and the second correction amount in accordance with on/off of the switching signal, and
wherein the calculation means is provided with a carrier-wave generator that generates a carrier wave for obtaining the switching signal and a holder that holds the differential detection signal in synchronization with the carrier wave, and selects one of the first correction amount and the second correction amount in accordance with the switching signal at a time point when the differential detection signal is held.

2. The electric-power conversion apparatus according to claim 1, wherein in the case where the phase width signal is larger than a predetermined value, the calculation means holds the differential detection signal during a duration in which the upper stage power semiconductor device is on and calculates the second output current based on the first correction amount, and in the case where the phase width signal is smaller than the predetermined value, the calculation means holds the differential detection signal during a duration in which the lower stage power semiconductor device is on and calculates the second output current based on the second correction amount.

3. The electric-power conversion apparatus according to claim 2, wherein the calculation means calculates the second output current, based on a value of the differential detection signal obtained by applying a filter having a time constant between approximately $\frac{1}{20}$ of the cycle of the carrier wave and approximately half of the cycle of the carrier wave to the differential detection signal.

4. The electric-power conversion apparatus according to claim 1, wherein the first electric potential is connected with a positive electrode of a battery mounted in a vehicle, the third electric potential is connected with an electric load mounted in the vehicle, and the reference electric potential is earthed to the vehicle body or connected with a negative electrode of the battery.

5. The electric-power conversion apparatus according to claim 1, wherein the first electric potential is connected with an electric load, the third electric potential is connected with the positive electrode of a battery mounted in a vehicle, and the reference electric potential is earthed to the vehicle body or connected with the negative electrode of the battery.

6. The electric-power conversion apparatus according to claim 1, wherein the differential detection circuit is formed of a circuit that is non-insulated from the reference electric potential.

7. An electric-power conversion apparatus comprising:
a chopper circuit;
a current sense resistor that detects a first output current of the chopper circuit;
a differential detection circuit that outputs, as a differential detection signal, an electric potential difference across the current sense resistor; and
a calculation means that corrects the differential detection signal from the differential detection circuit by use of a control signal so as to calculate a second output current of the chopper circuit;
wherein the calculation means calculates a switching signal for turning on or off the chopper circuit based on a phase width signal, which is the control signal for the chopper circuit, and calculates the second output current of the chopper circuit based on the differential detection signal;
wherein the chopper circuit is configured with an upper stage power semiconductor device connected between a first electric potential and a second electric potential and a lower stage power semiconductor device connected between the second electric potential and a reference electric potential;
wherein the current sense resistor is connected between the second electric potential and a third electric potential;
wherein the differential detection circuit detects the electric potential difference between the second electric potential and the third electric potential,
wherein the calculation means is provided with a first correction amount and a second correction amount and selects, as a correction amount for calculating the second output current of the chopper circuit, one of the first correction amount and the second correction amount in accordance with on/off of the switching signal, wherein the calculation means is provided with a third correction amount and a fourth correction amount;

wherein in the case where, as the correction amount for calculating the second output current of the chopper circuit, the first correction amount is selected, the calculation means selects the third correction amount and performs multiplication; and wherein in the case where, as the correction amount for calculating the second output current of the chopper circuit, the second correction amount is selected, the calculation means selects the fourth correction amount and performs multiplication.

8. An electric-power conversion apparatus comprising:

a chopper circuit;

a current sense resistor that detects a first output current of the chopper circuit;

a differential detection circuit that outputs, as a differential detection signal, an electric potential difference across the current sense resistor; and a calculation means that corrects the differential detection signal from the differential detection circuit by use of a control signal so as to calculate a second output current of the chopper circuit;

wherein the calculation means calculates a switching signal for turning on or off the chopper circuit based on a phase width signal, which is the control signal for the chopper circuit, and calculates the second output current of the chopper circuit based on the differential detection signal;

wherein the chopper circuit is configured with an upper stage power semiconductor device connected between a first electric potential and a second electric potential and a lower stage power semiconductor device connected between the second electric potential and a reference electric potential;

wherein the current sense resistor is connected between the second electric potential and a third electric potential;

wherein the differential detection circuit detects the electric potential difference between the second electric potential and the third electric potential, wherein the calculation means calculates a correction amount for the differential detection signal based on a value proportional to the phase width signal, which is the control signal for the chopper circuit, and wherein the calculation means is provided with a carrier-wave generator that generates a carrier wave for obtaining a switching signal that turns on or off the chopper circuit, and calculates the second output current, based on a value of the differential detection signal obtained by applying a filter having a time constant between approximately $1/20$ of the cycle of the carrier wave and approximately half of the cycle of the carrier wave to the differential detection signal.

* * * * *